US011156949B2

(12) United States Patent
Yamamoto et al.

(10) Patent No.: US 11,156,949 B2
(45) Date of Patent: Oct. 26, 2021

(54) IMAGE FORMING APPARATUS

(71) Applicant: CANON KABUSHIKI KAISHA, Tokyo (JP)

(72) Inventors: Tetsuya Yamamoto, Suntou-gun (JP); Masatoshi Itoh, Mishima (JP); Daisuke Usami, Yokohama (JP); Kentaro Yamashita, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 736 days.

(21) Appl. No.: 15/873,134

(22) Filed: Jan. 17, 2018

(65) Prior Publication Data

US 2018/0203392 A1    Jul. 19, 2018

(30) Foreign Application Priority Data

Jan. 19, 2017 (JP) .............................. JP2017-007605
Jan. 19, 2017 (JP) .............................. JP2017-007606
Jan. 19, 2017 (JP) .............................. JP2017-007607

(51) Int. Cl.
*G03G 15/20* (2006.01)
*G06F 3/12* (2006.01)
(Continued)

(52) U.S. Cl.
CPC ......... *G03G 15/206* (2013.01); *G03G 15/205* (2013.01); *G03G 15/5004* (2013.01);
(Continued)

(58) Field of Classification Search
CPC ............... G03G 15/205; G03G 15/206; G03G 15/5004; G06F 3/1215; G06F 3/1221;
(Continued)

(56) References Cited

U.S. PATENT DOCUMENTS 7,136,601 B2    11/2006  Akizuki et al.
8,755,705 B2     6/2014  Nakahara et al.
(Continued)

FOREIGN PATENT DOCUMENTS

JP    2000-162908 A     6/2000
JP    2002-352936 A    12/2002
(Continued)

OTHER PUBLICATIONS

Japanese Office Action dated Dec. 22, 2020 in counterpart Japanese Patent Application No. 2017-007605.

(Continued)

*Primary Examiner* — Walter L Lindsay, Jr.
*Assistant Examiner* — Geoffrey T Evans
(74) *Attorney, Agent, or Firm* — Venable LLP

(57) ABSTRACT

The image forming apparatus includes a fixing device that has a heater, and a required power calculation unit that determines a power Pfsr that is assumed to be required by the heater. Based on a difference between a required power that is determined by the required power calculation unit and a suppliable power, the image forming apparatus selects whether to start printing in a normal mode or to start printing in a power saving mode in which the power that is supplied to the heater is reduced in comparison to the normal mode. The power saving mode includes a plurality of modes, and when a CPU selects the power saving mode, the CPU selects one or a combination of modes from among the plurality of power saving modes based on the aforementioned difference.

7 Claims, 15 Drawing Sheets

(51) Int. Cl.
  *G03G 15/00* (2006.01)
  *G06K 15/00* (2006.01)
(52) U.S. Cl.
  CPC .......... *G06F 3/1215* (2013.01); *G06F 3/1221* (2013.01); *G06F 3/1229* (2013.01); *G06F 3/1237* (2013.01); *G06K 15/406* (2013.01); *G06K 15/4055* (2013.01); *Y02D 10/00* (2018.01)
(58) Field of Classification Search
  CPC . G06F 3/1229; G06F 3/1237; G06K 15/4055; G06K 15/406; Y02D 10/00; Y02D 10/1592
  See application file for complete search history.

(56) References Cited

U.S. PATENT DOCUMENTS

| | | | |
|---|---|---|---|
| 9,335,709 B2 | 5/2016 | Iwasaki et al. | |
| 9,442,440 B2 | 9/2016 | Hashiguchi et al. | |
| 9,575,456 B2 | 2/2017 | Itoh | |
| 9,665,048 B2 | 5/2017 | Iwasaki et al. | |
| 2008/0199198 A1* | 8/2008 | Nishi | G03G 15/2039 399/69 |
| 2017/0102656 A1 | 4/2017 | Yamashita et al. | |

FOREIGN PATENT DOCUMENTS

| | | |
|---|---|---|
| JP | 2004-078181 A | 3/2004 |
| JP | 2006-317634 A | 11/2006 |
| JP | 2008-034647 A | 12/2008 |
| JP | 2009-008898 A | 1/2009 |
| JP | 2009-198599 A | 9/2009 |
| JP | 2010-117652 A | 5/2010 |
| JP | 2013-003553 A | 1/2013 |
| JP | 2014-006337 A | 1/2014 |
| JP | 2014-035410 A | 2/2014 |
| JP | 2015-099180 A | 5/2015 |

OTHER PUBLICATIONS

Japanese Office Action dated Jul. 6, 2021 in counterpart Japanese Patent Application No. 2017-007605.

* cited by examiner

IMAGE FORMING APPARATUS

BACKGROUND OF THE INVENTION

Field of the Invention

The present invention relates to an image forming apparatus, for example, a copier or a printer, that is equipped with a fixing device for fixing an unfixed toner image.

Description of the Related Art

Accompanying increases in the speeds of image forming apparatuses in recent years, the power which the image forming apparatuses consume is also increasing. In particular, in a high-speed color laser printer which is required to perform image formation of multiple toner images simultaneously, the current that driving devices such as a motor and the like consume is large. Although image forming apparatuses are designed to be capable of supplying power required for a fixing process under standard conditions with respect to the AC power supply voltage, ambient temperature, load and the like to a fixing device, in the case of image forming apparatuses which consume a large amount of power, the design of such apparatuses is becoming such that there is little margin with respect to the maximum current that the AC power supply can supply. Therefore, a state sometimes arises in which the power required for a fixing process cannot be supplied to the fixing device due to the occurrence of overlapping factors such as a low input voltage of the AC power supply, a low room temperature, and a large power consumption of the load due to deterioration.

Therefore, technology has been proposed that detects environmental conditions such as the room temperature and also detects the state of the temperature of a fixing device and the state of a load of a printer, and based on the obtained detection results, predicts whether or not the current required for operations of the printer will exceed the maximum current that is suppliable by the AC power supply (for example, see Japanese Patent Application Laid-Open No. 2015-099180). If it is determined that the required current exceeds the maximum suppliable current, the throughput that is the number of printing sheets per unit time is lowered by widening a conveyance interval between recording sheets at an initial stage of printing. By this means, the current required for operations of the printer is suppressed to an amount no more than the maximum current that is suppliable, and a situation is thus avoided in which the power required to ensure favorable fixability cannot be supplied to the fixing device.

In the printing method that suppresses power consumption by widening a conveyance interval to thereby suppress the required current to an amount less than or equal to the maximum current, for example, when the fixing device heats up during continuous printing that is being continued and the required power for the fixing device thus changes to a lower state, it is easy to narrow the conveyance interval and increase the throughput. However, when it is attempted to significantly reduce the power required for a fixing process, the conveyance interval must be widened by a large amount at the initial stage of printing. As a result, in a case where a print job is a job that involves printing approximately one or two sheets, in some cases the time required to complete the designated print job is long.

SUMMARY OF THE INVENTION

One aspect of the present invention is an image forming apparatus that realizes high productivity while suppressing a current required for operation of a printer to an amount equal to or less than the maximum current that is suppliable.

Another aspect of the present invention is an image forming apparatus including an image forming unit configured to form an unfixed toner image on a recording material, a fixing unit having a heater, the fixing unit configured to fix an unfixed toner image formed by the image forming unit onto a recording material by means of heat of the heater, a suppliable power obtaining unit configured to obtain a suppliable power that is suppliable to the heater, and a required power obtaining unit configured to obtain a required power that is assumed to be required by the heater for fixing an unfixed toner image onto a recording material, wherein based on a difference between the required power and the suppliable power, the apparatus selects whether to start printing in a first mode or to start printing in a plurality of second modes in each of which a power supplied to the heater is reduced compared to the first mode, wherein in a case where the apparatus selects one of the plurality of second modes, the apparatus selects one mode or a combination of the modes among the plurality of the second modes based on the difference.

A further aspect of the present invention is an image forming apparatus including an image forming unit configured to form an unfixed toner image on a recording material, a fixing unit that has a heater, the fixing unit configured to fix an unfixed toner image formed by the image forming unit onto a recording material by means of heat of the heater, a first detection unit configured to detect a temperature inside the apparatus, a warmed-up condition obtaining unit configured to calculate a degree of heat storage in the fixing unit, an average printing rate obtaining unit configured to obtain an average printing rate of a toner image printed on one side of a recording material based on image information, and a required power obtaining unit configured to obtain a required power assumed to be required by the heater in order to fix an unfixed toner image onto a recording material, based on a temperature inside the apparatus that is detected by the first detection unit, a degree of heat storage in the fixing unit calculated by the warmed-up condition obtaining unit, and the average printing rate obtained by the average printing rate obtaining unit.

A further aspect of the present invention is an image forming apparatus including an image forming unit configured to form an unfixed toner image on a recording material, a fixing unit that has a heater, the fixing unit configured to fixe an unfixed toner image formed by the image forming unit onto a recording material by means of heat of the heater, a first detection unit that detects a current that flows to the heater, and a predicted required power obtaining unit configured to calculate a predicted required power that is assumed to be required by the heater in a case where a predetermined number of sheets of recording material are going to be printed, based on a power amount for the predetermined number of sheets measured based on a detection result of the first detection unit when a fixing process is performed by the fixing unit on the predetermined number of sheets, and an average printing rate of toner images for the predetermined number of sheets that are going to be printed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Modes for carrying out the present invention will be described in detail below by way of exemplary embodiments with reference to the attached drawings. Note that, the following exemplary embodiments are provided merely for exemplification purposes, and the present invention is not limited to these configurations.

Embodiment 1

[Image Forming Apparatus]

Figure 1:
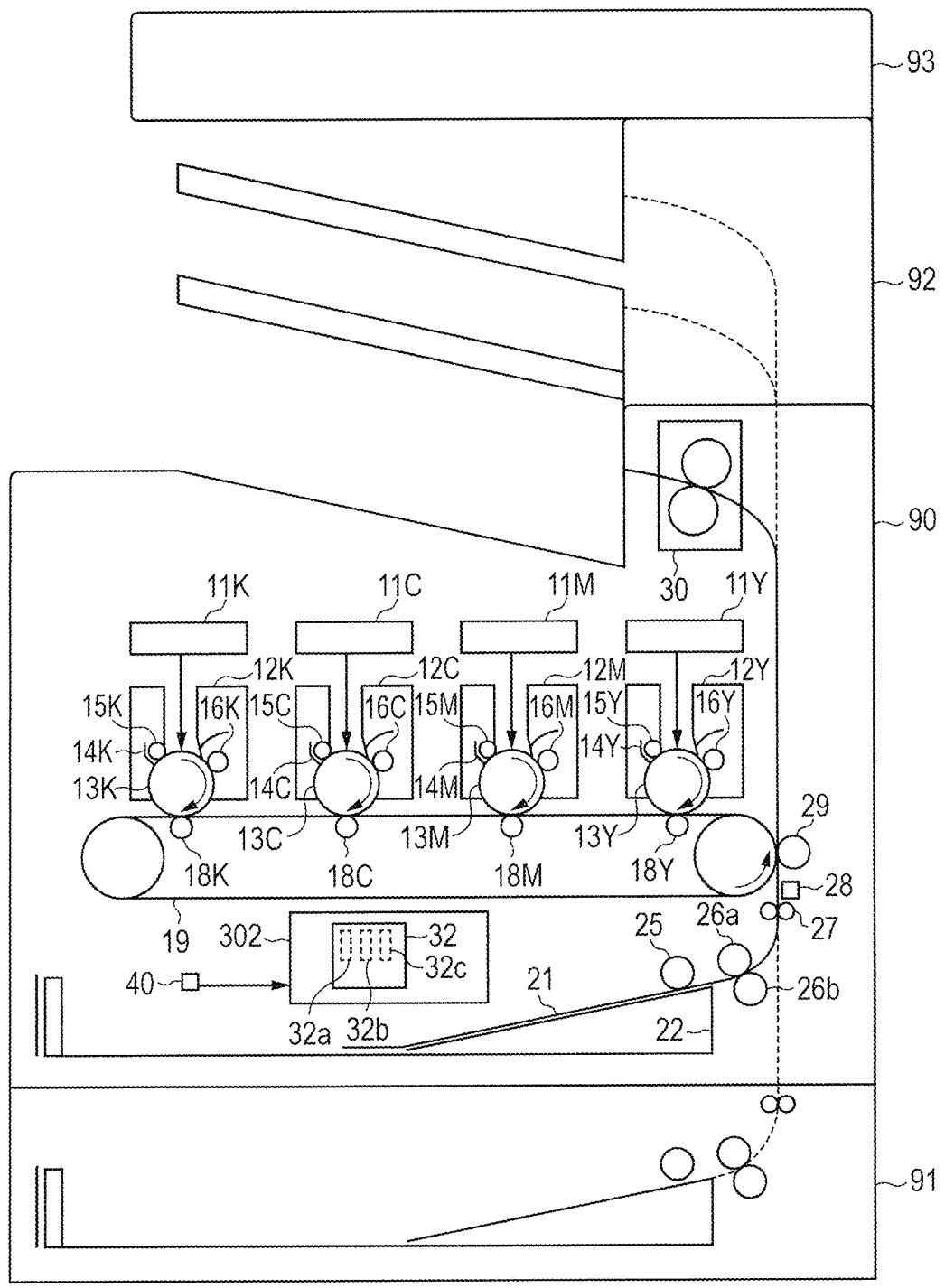
FIG. 1 is a cross-sectional view of an image forming apparatus of Embodiments 1 and 2.

FIG. 1 is a cross-sectional view of a tandem-type color image forming apparatus that uses an electrophotographic process. The configuration and image forming operations of an image forming apparatus 90 will be described using FIG. 1. The tandem-type color image forming apparatus is configured to be capable of outputting a full-color image by superimposing toner of the four colors of yellow (Y), magenta (M), cyan (C) and black (K). Hereunder, the suffixes Y, M, C and K of the reference symbols which denote the respective colors are omitted unless required for the purpose of distinguishing between the colors.

Laser scanners 11 and cartridges 12 are provided for performing image formation of each color. Each cartridge is constituted from a developing device having a photosensitive drum 13 that is a photosensitive member that rotates in the direction of the relevant arrow in the drawing, a drum cleaner 14 that is provided so as to contact the photosensitive drum 13, a charge roller 15, and a developing roller 16. In addition, an intermediate transfer belt 19 contacts the respective photosensitive drums 13 for each of the colors, and primary transfer rollers 18 are disposed so as to face the respective photosensitive drums 13 with the intermediate transfer belt 19 interposed therebetween.

In a cassette 22 that stores sheets 21 as recording material, a sheet feeding roller 25, separation rollers 26a and 26b, and a registration roller 27 are provided on a downstream side in the conveyance direction of the sheets 21 (hereunder, referred to as "conveyance direction downstream side"). A conveyance sensor 28 is provided in the vicinity of the registration roller 27 on the conveyance direction downstream side thereof. Further, on the conveyance direction downstream side of the conveyance path, a secondary transfer roller 29 is provided so as to contact against the intermediate transfer belt 19, and a fixing device 30 as a fixing unit is arranged on the conveyance direction downstream side of the secondary transfer roller 29. An engine control unit 302 is a control unit of a laser printer. The engine control unit 302 is constituted by a CPU (central processing unit) 32 that includes a ROM 32a, a RAM 32b, a timer 32c and the like, and various control circuits (unshown) for input and output operations. The members that form an unfixed toner image on the sheet 21 (on recording material) function as an image forming unit.

Next, the electrophotographic process will be briefly described. At a dark place inside the cartridge 12, the surface of the photosensitive drum 13 is uniformly charged by the charge roller 15. Next, a laser beam that was modulated according to image data (image information) by the laser scanner 11 is irradiated onto the surface of the photosensitive drum 13. Thus, an electrostatic latent image is formed on the surface of the photosensitive drum 13 as a result of the electrostatic charge being removed from a portion that was irradiated with the laser beam on the photosensitive drum 13. At the respective developing devices, toner from the developing roller 16 on which a toner layer of a fixed amount is held is attracted by a developing voltage to the electrostatic latent image on the photosensitive drum 13. By this means, toner images of each color are formed on the surfaces of the respective photosensitive drums 13.

Each toner image formed on the surface of the corresponding photosensitive drum 13 is transferred onto the intermediate transfer belt 19 by the action of a transfer voltage applied to the primary transfer roller 18, at a nip portion between the photosensitive drum 13 and the intermediate transfer belt 19. Further, the CPU 32 controls the timing of image formation at each cartridge 12 according to a timing that depends on the conveyance speed of the intermediate transfer belt 19. The CPU 32 causes the toner images of each color that were formed on the respective photosensitive drums 13 to be transferred sequentially onto the intermediate transfer belt 19. By this means, a full-color image is ultimately formed on the intermediate transfer belt 19.

On the other hand, the sheets 21 inside the cassette 22 are conveyed by the sheet feeding roller 25, and only one sheet is separated therefrom by the separation rollers 26a and 26b, and the separated sheet 21 passes through the registration roller 27 and is conveyed to the secondary transfer roller 29. Thereafter, at a nip portion between the secondary transfer roller 29 and the intermediate transfer belt 19 that is on the conveyance direction downstream side of the registration roller 27, the toner images on the intermediate transfer belt 19 are transferred onto the sheet 21. The sheet 21 onto which the unfixed toner images were transferred is conveyed to the fixing device 30, and the toner images on the sheet 21 are subjected to a fixing process by the fixing device 30. The sheet 21 that underwent the fixing process is delivered to outside of the image forming apparatus 90. The image forming apparatus 90 is equipped with a temperature sensor 40 that measures the temperature inside the apparatus. The CPU 32 is configured to be capable of performing settings for image formation that depend on the temperature measured by the temperature sensor 40. A sheet feeding unit 91 for increasing the amount of sheets that can be fed, a discharge unit 92 for increasing the amount of sheets that can be delivered, and an image scanner (image reader) 93 that reads an image of an original are connected as optional apparatuses to the image forming apparatus 90. Note that, a combination of the options connected to the image forming apparatus 90 is not limited to the configuration shown in FIG. 1.

[Fixing Device]

Figure 2:
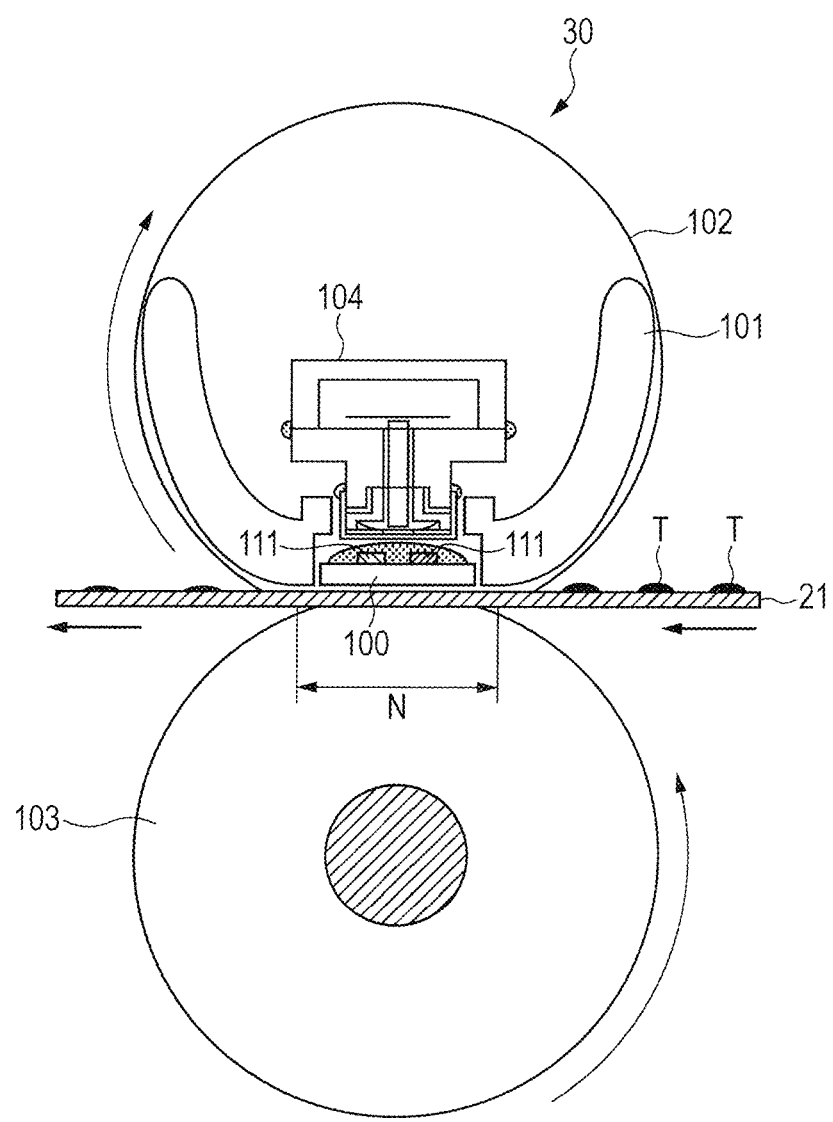
FIG. 2 is a cross-sectional view of a fixing device of Embodiments 1 and 2.

The configuration of the fixing device 30 will now be described using FIG. 2. FIG. 2 is a cross-sectional view of the fixing device 30. The fixing device 30 is, for example, a heating apparatus that adopts a film-heating method that uses an endless film (cylindrical film), and that is of a type that drives a pressure roller to drive the film to rotate. The fixing device 30 includes a heater 100, a heater holder 101, a heat-resistant film (hereunder, referred to as "fixing film") 102, a pressure roller 103, a protecting element 104 and a thermistor 54 (see FIG. 3). The heater 100 is a ceramic heater formed by printing a heating element 111 on a substrate made of ceramic. The heater holder 101 holds the heater 100 so as to contact a face on which the heating element 111 of the heater 100 is printed. The material of the heater holder 101 is PPS (polyphenylene sulfide) that is a material which is excellent in heating resistance and rigidity. The fixing film 102 is loosely fitted to the exterior of the heater holder 101 to which the heater 100 is attached. The pressure roller 103 comes into mutual press-contact with the heater 100 the fixing film 102 interposed therebetween to thereby form a fixing nip portion N. The protecting element 104 of the present example is a thermo-switch, and a heat-sensitive face of the thermo-switch comes into contact with a face of the heater 100. The thermistor 54 as a temperature detecting element is disposed side-by-side with the protecting element 104 in a collinear state in the longitudinal direction (direction perpendicular to the page surface in FIG. 2) of the heater 100.

The pressure roller 103 is driven in the direction of the arrow by a motor (not illustrated in the drawing). When the pressure roller 103 rotates, the fixing film 102 rotates by frictional force to follow the rotation of the pressure roller 103. The fixing film 102 rotates in the clockwise direction that is indicated by an arrow so as to rotate around the outside of the heater holder 101 while the inner face of the fixing film 102 slides while maintaining close contact with the heater 100.

The heater 100 is controlled so as to maintain a predetermined temperature during the fixing process. In a state in which the heater 100 is controlled to a predetermined temperature, the sheet 21 bearing an unfixed toner image T is conveyed to the fixing nip portion N. At the fixing nip portion N, the unfixed toner image T on the sheet 21 is heated and pressurized and melts, and the toner image T is thereby fixed onto the sheet 21.

The fixing device 30 having the configuration illustrated in FIG. 2 has a characteristic that the thermal capacity of the fixing film 102 is small and the temperature thereof can be raised to a predetermined temperature in a short time. On the other hand, the structures other than the fixing film 102 have a thermal capacity that is large in comparison to the fixing film 102. Therefore, even if the supply of power to the heater 100 is started simultaneously with a print instruction, structures other than the fixing film 102 will not be adequately warmed-up at the stage at which the first (initial) sheet 21 in the print job arrives at the fixing nip portion N. Therefore, the power amount of required by the fixing device 30 in an initial stage when image formation has started is large because power that is required for warming up the structures inside the fixing device 30 is also included therein, and the required power decreases as the fixing device 30 gradually warms up. Note that, the fixing device of the present example does not supply any power to the heater 100 while on standby, awaiting a print instruction.

[Circuitry Structure]

Figure 3:
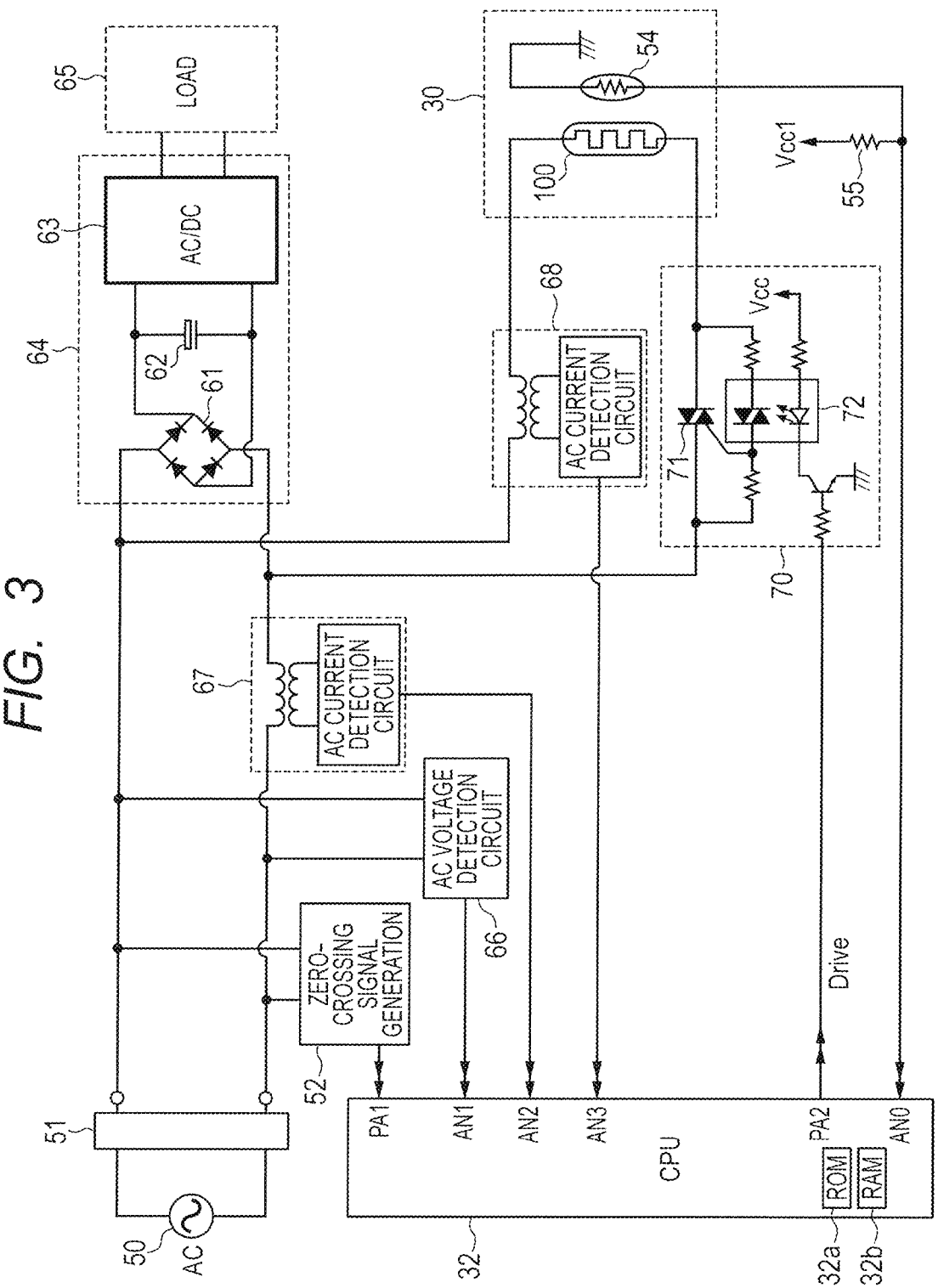
FIG. 3 is a view illustrating a circuit that is applied in Embodiments 1 and 2.

Next, the main circuit structure relating to Embodiment 1 will be described using the circuit diagram in FIG. 3. An AC power supply 50 for commercial use is connected to the image forming apparatus 90. The AC power supply 50 is connected to a switching power supply (hereunder, referred to as "power supply") 64 and the heater 100 of the fixing device 30 through an AC filter 51. The CPU 32 is a control unit that executes various kinds of control of the image forming apparatus 90 that include driving control of the heater 100, and is constituted by respective input and output ports and the ROM 32a and the RAM 32b and the like. The AC power supply 50 is also connected through the AC filter 51 to a generation circuit 52 that generates a zero-crossing signal. The generation circuit 52 has a configuration in which a zero-crossing signal that is an output signal inverts when the voltage of the AC power supply 50 is less than a threshold voltage in the vicinity of 0 V or is equal to or higher than the threshold voltage. The zero-crossing signal is utilized for controlling the timing of driving of the heater 100. The output signal of the generation circuit 52 is input to a PA1 port of the CPU 32. The heater 100 is driven on the basis of the zero-cross timing by a driving circuit 70 of the heater 100 that is constituted centering on a bidirectional thyristor (hereunder, referred to as "triac") 71 and a triac coupler 72. The driving circuit 70 controls the power that is supplied to the heater 100.

The heater 100 generates heat when power is supplied thereto. The temperature of the heater 100 is detected by the thermistor 54 that is a temperature sensing element disposed on the rear face of the heater 100. A voltage that is divided by the thermistor 54 and a fixed resistance 55 is input to an analog input port AN0 (hereunder, referred to as "AN0 port") of the CPU 32. The thermistor 54 has a characteristic such that a resistance value thereof decreases as the temperature increases, and the CPU 32 detects the current temperature of the heater 100 by monitoring the voltage that is input to the AN0 port and referring to a voltage-temperature conversion table that is set in advance. Based on a difference between the temperature detected by means of the voltage-temperature conversion table and a control target temperature, the CPU 32 outputs a Drive signal for driving the driving circuit 70 from a PA2 port to the driving circuit 70. On the other hand, a power supply 64 includes a diode bridge 61 and a smoothing capacitor 62 for rectifying an AC voltage, and a DC-DC convertor 63 that is a power supply portion for generating a DC voltage that is at a subsequent stage. The DC voltage that is generated by the power supply 64 is supplied to a load 65 on the secondary side such as a control unit and a driving unit of the image forming apparatus 90.

A line on a downstream side of the AC filter 51 is connected to a voltage detection circuit 66 that is a first detection unit that detects an AC voltage. The voltage detection circuit 66 outputs a voltage value corresponding to an effective value voltage of the AC power supply 50 to an output line isolated from the primary side using a transformer, for example. The voltage value from the voltage detection circuit 66 is input to an analog input port AN1 (hereunder, referred to as "AN1 port"). The CPU 32 detects the effective value voltage of the AC power supply 50 based on the voltage value that is input. A current detection circuit 67 that is a second detection unit that detects an AC current is provided at a position that is further on the side of the AC power supply 50 relative to a portion at which the line branches to the power supply 64 and the driving circuit 70. The current detection circuit 67 outputs a voltage value that corresponds to an effective value of an AC current that flows in an output line isolated from the primary side using a transformer. The voltage value from the current detection circuit 67 is input to an analog input port AN2 (hereunder, referred to as "AN2 port"). It is possible for the CPU 32 to detect the total of the values of current consumed by the power supply 64 and the heater 100 of the fixing device 30 as loads, based on the voltage value that is input.

On the other hand, a current detection circuit 68 that is a third detection unit is disposed at a position at which the current detection circuit 68 can detect the value of a current that flows to the heater 100 and does not flow to the power supply 64. The current detection circuit 68 outputs a voltage value corresponding to the detected current value to the CPU 32. The voltage value from the current detection circuit 68 is input to an analog input port AN3 (hereunder, referred to as "AN3 port"). The CPU 32 detects a current that flows to the heater 100 based on the voltage value that is input. Further, the CPU 32 detects the power consumed by the heater 100 based on the detection result of the voltage detection circuit 66 and the detection result of the current detection circuit 68.

[System Configuration of Printer]

Figure 4:
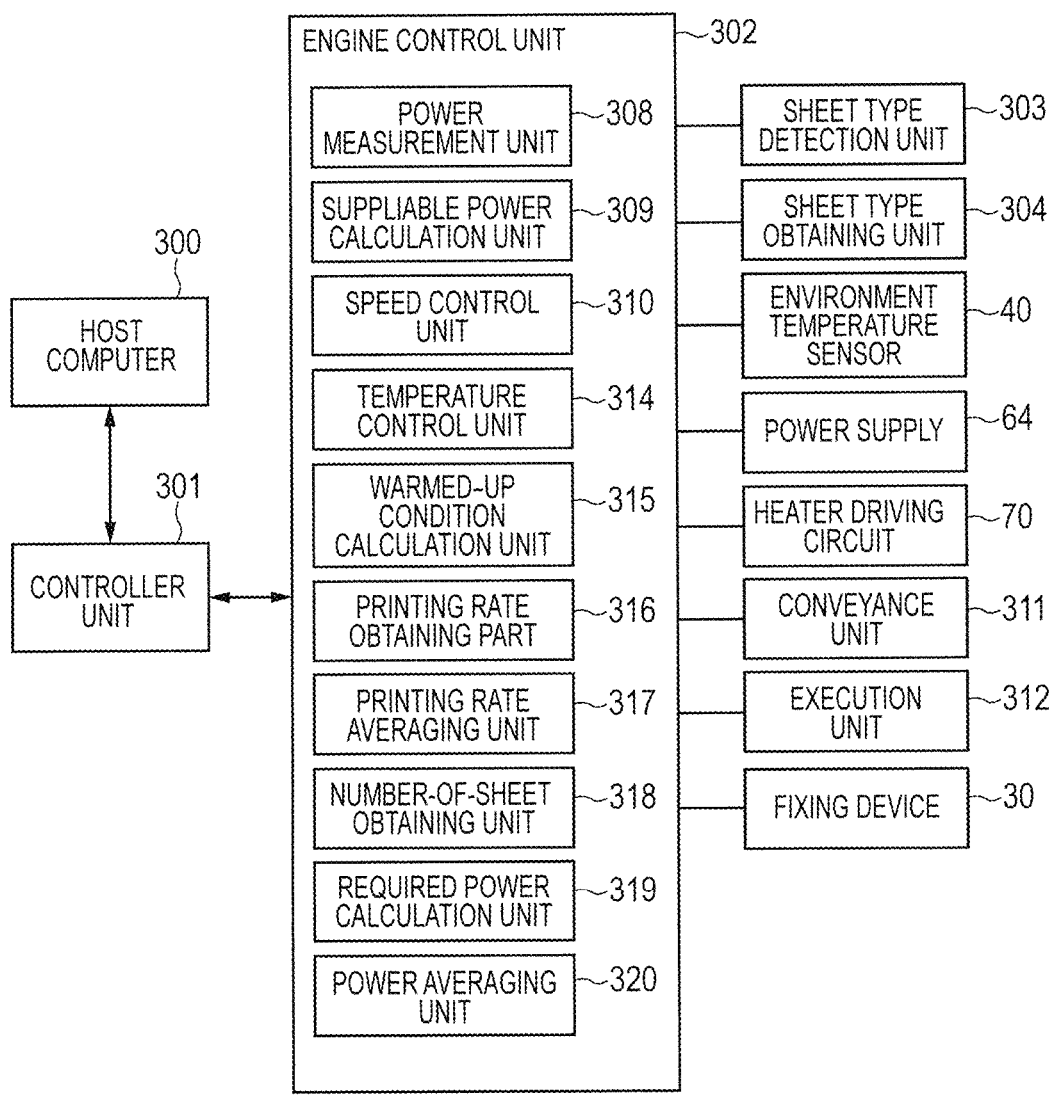
FIG. 4 is a block diagram illustrating the system configuration of the image forming apparatus of Embodiments 1 and 2.

Next, the system configuration and interfaces of the printer will be described. FIG. 4 is a block diagram illustrating the system configuration around the printer illustrated in FIG. 1. Operations of the engine control unit 302 are realized based on a program that is written in advance in the ROM 32a inside the CPU 32.

The engine control unit 302 receives information from a sheet type detection unit 303 that detects information with regard to the sheet type of the sheet 21, a sheet type obtaining unit 304 that obtains information with regard to the sheet type of the sheet 21 that is set in advance by a user or the like, and the temperature sensor 40 that detects a temperature inside the image forming apparatus 90. The engine control unit 302 controls the power supply 64 and the driving circuit 70. The engine control unit 302 also includes a power measurement unit 308 that measures consumed power, a suppliable power calculation unit (suppliable power obtaining unit) 309 that calculates a maximum power that is suppliable to the heater 100, and a speed control unit 310 that controls an image forming speed (printing speed) of an image forming operation (image forming process). Further, the engine control unit 302 controls a conveyance unit 311 that conveys the sheet 21, an execution unit 312 that is members such as the photosensitive drum 13 that execute an image forming operation from the charging process to the transferring process, and the fixing device 30. The engine control unit 302 also includes a temperature control unit 314 that controls the temperature of the heater 100, and a warmed-up condition calculation unit 315 that calculates the level to which the fixing device 30 is warmed up (warmed-up condition) of. In addition, the engine control unit 302 includes a printing rate obtaining part 316 that, based on image information, obtains a printing rate of a toner image that is printed on one side of the sheets 21, and a printing rate averaging unit 317 that is an averaging unit that determines an average printing rate of the printing rates obtained by the printing rate obtaining part 316. The engine control unit 302 further includes a number-of-sheet obtaining unit 318 that identifies sheets 21 for which the printing rate is higher than a predetermined printing rate from among a plurality of the sheets 21. The engine control unit 302 also includes a required power calculation unit (required power obtaining unit) 319 that calculates a power that is assumed to be required by the heater 100, and a power averaging unit 320 that determines an average of the consumed power. A controller unit 301 is configured to be capable of intercommunication with a host computer 300 and the engine control unit 302. Note that, in the following description, the term "high printing rate" refers to a printing rate that is higher than a predetermined printing rate, and the term "low printing rate" refers to a printing rate that is equal to or lower than the predetermined printing rate.

[Printing Mode Selection Processing]

Figure 5:
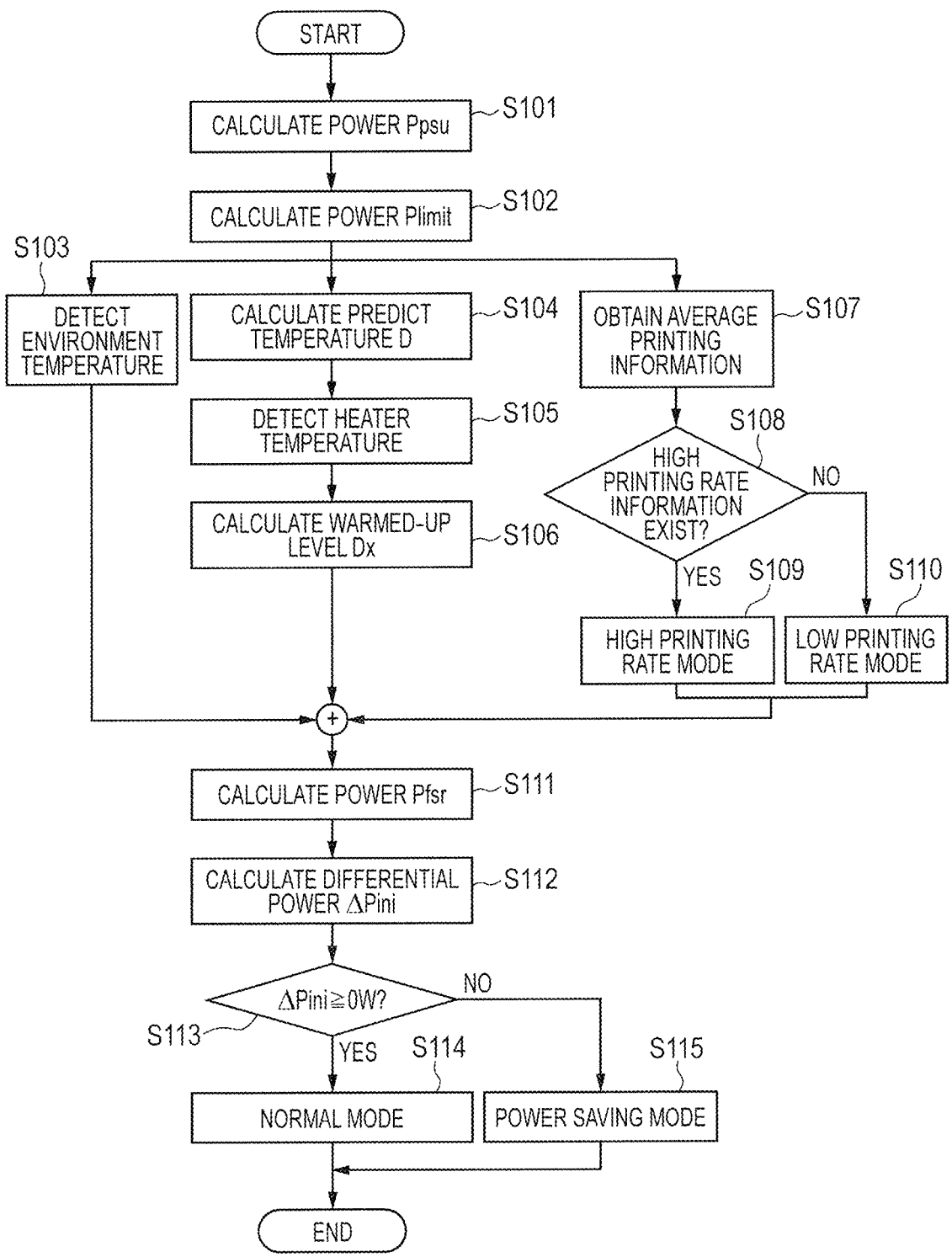
FIG. 5 is a flowchart illustrating processing for determining power supply availability of Embodiments 1 and 2.
Figure 7:
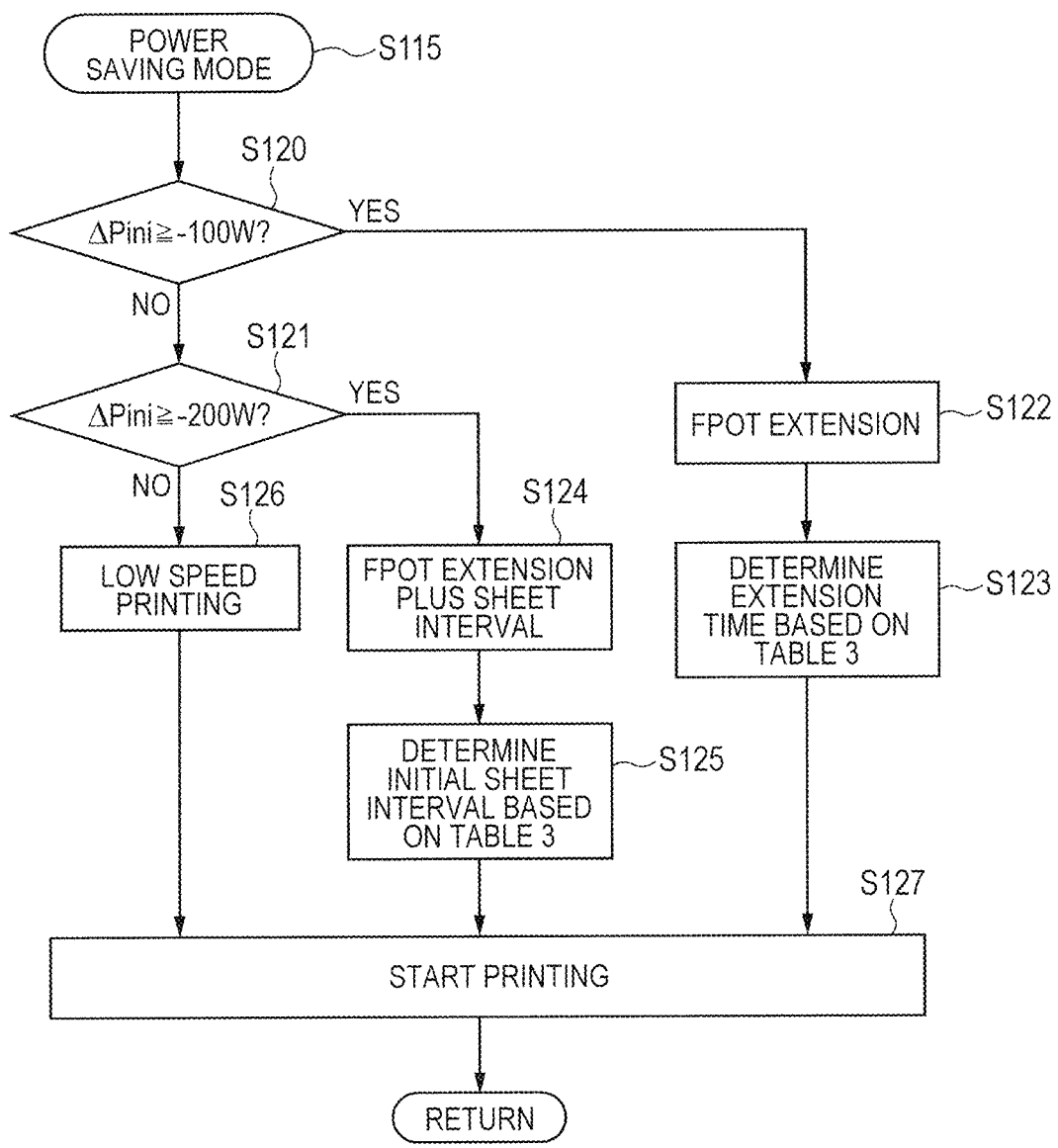
FIG. 7 is a flowchart illustrating processing for selecting a power saving mode of Embodiment 1.
Figure 8:
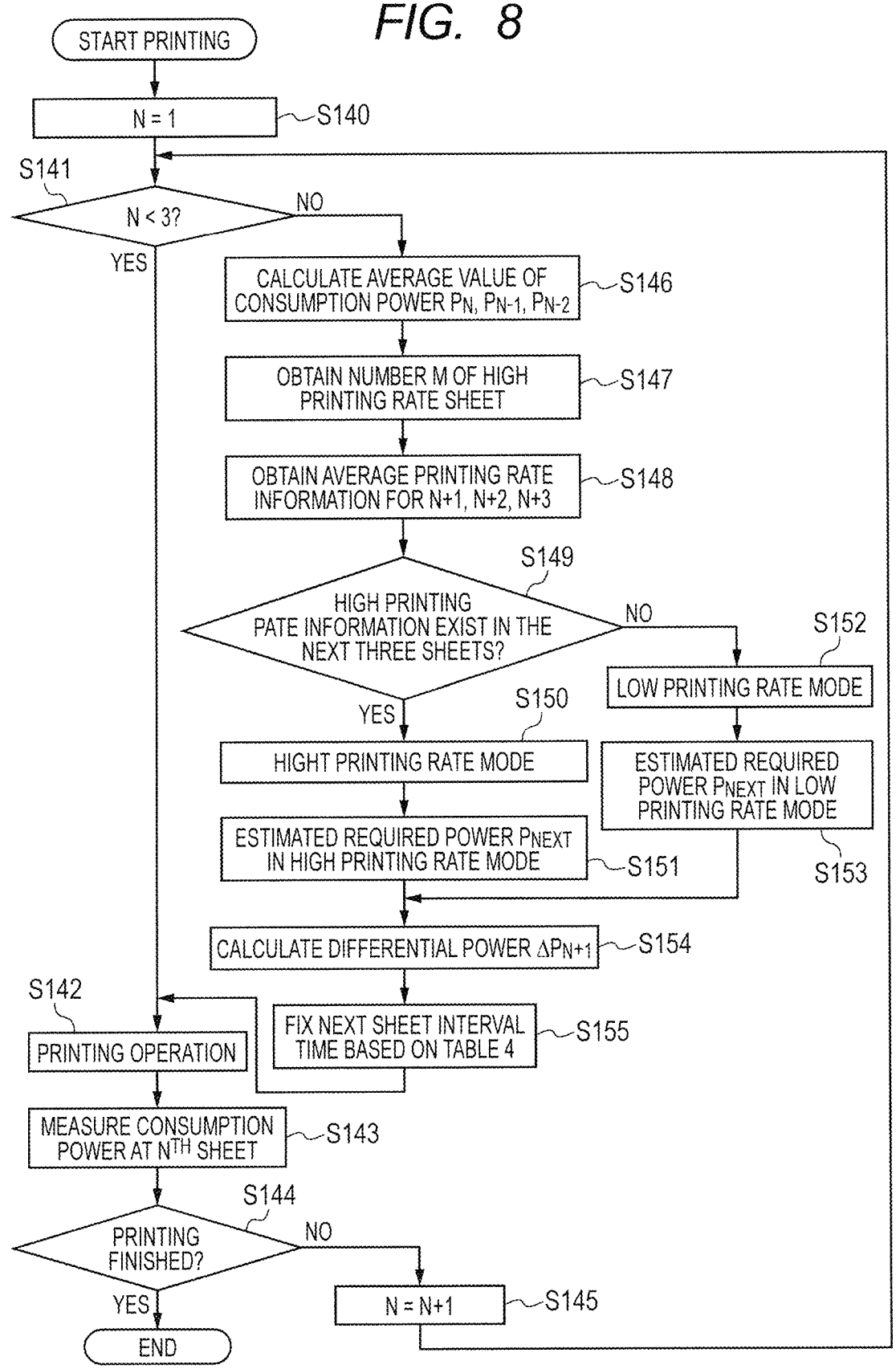
FIG. 8 is a flowchart illustrating processing for determining whether it is necessary to change the throughput after printing starts of Embodiment 1.

Next, specific control of Embodiment 1 is described using the flowcharts of FIG. 5, FIG. 7 and FIG. 8. The control processing illustrated in the flowcharts is executed by the CPU 32 of the engine control unit 302 in accordance with a program that is stored in advance in the ROM 32a. The control of Embodiment 1 is broadly divided into the following three kinds of processing.

(1) Processing for determining whether or not it is possible to supply power to the heater (hereunder, referred to as "power supply availability")

(2) Processing for selecting a power saving mode (3) Processing for determining whether or not it is necessary to change the throughput after printing starts (hereunder, referred to as "change necessity")

Each of the above described kinds of processing is described in detail hereunder.

(1) Processing for Determining Power Supply Availability

When a print job is sent to the CPU 32, the CPU 32 calculates the power that is suppliable to the heater 100 of the fixing device 30 by means of the suppliable power calculation unit 309, and calculates the power that is assumed to be required by the heater 100 in the initial stage of the print job by means of the required power calculation unit 319. The CPU 32 compares the calculated power suppliable to the heater 100 and the power required by the heater 100. Based on the comparison result, the CPU 32 determines whether or not it is possible to supply the power to the heater 100. Next, the CPU 32 determines whether to execute normal image formation or to execute image formation in a power saving mode that reduces the power consumption. The processing for determining the power supply availability will now be described using the flowchart of FIG. 5.

In step (hereunder, abbreviated to "S") 101, in order to calculate a power Plimit suppliable to the heater 100, the CPU 32 uses the following Formula (1) to calculate a power Ppsu that is a power supply load power that the load 65 on the secondary side consumes, by means of the suppliable power calculation unit 309.

$$Ppsu = Pe + Pfeed + Pdeliv + Pis \quad (1)$$

Here, a power Pe represents the load power of the image forming apparatus 90 excluding the power consumed by the heater 100, and a power that is determined based on results detected by the voltage detection circuit 66 and the current detection circuit 67 is used as the power Pe. The timing at which the power Pe is obtained is preferably a timing at which power is not being supplied to the heater 100. For example, the power Pe is obtained at a timing that is after the supply of power to the heater 100 ended when the previous image formation finished. The power Pe that is obtained and calculated at such a timing is, for example, stored in the RAM 32b, and is used when calculating the power Ppsu at the time of the next print job. A power Pfeed represents the power consumed by the sheet feeding unit 91, a power Pdeliv represents the power consumed by the discharge unit 92, and a power Pis represents the power consumed by the image scanner 93.

For the power Pfeed, Pfeed=60 W is added uniformly in a case where the sheet feeding unit 91 is mounted to the printer, and feeding of sheets from the sheet feeding unit 91 is specified in the print job. Further, for the power Pdeliv, Pdeliv=80 W is added uniformly in a case where the discharge unit 92 is mounted to the printer, and discharge of sheets to the discharge unit 92 is specified in the print job. The power values of the sheet feeding unit 91 and the discharge unit 92 that are options are determined by examining the required power of each unit at the design stage, and are values that are stored in advance in the ROM 32a as fixed values. Note that, as other means, a method is also possible in which the respective units are operated individually at a timing other than the timing of an image forming operation, and which measures the actual power consumed during such operation.

The power Pis is the power that is consumed by the image scanner 93. With respect to the image scanner 93, it is necessary to assume that, in addition to a copy function that prints a read (scanned) image, the image scanner 93 will be operated by a user to perform operations that are independent of a print job, such as to perform a function that attaches scanned data to an electronic mail message and sends the electronic mail message or that sends a FAX and the like. Therefore, in a case where the image scanner 93 is mounted to the printer, Pis=80 W is added uniformly. Similarly to the case of the sheet feeding unit 91 and the discharge unit 92, with respect to the power Pis also, a method can also be adopted in which the power Pis is not a fixed value and instead the value of power that is actually measured during operation when the image scanner 93 is operated individually is used.

In S102, the CPU 32 uses the following Formula (2) to calculate the power Plimit that is suppliable to the heater 100 by means of the suppliable power calculation unit 309.

$$Plimit = Ilimit \times Vin \times Kpf - Ppsu \quad (2)$$

Here, the voltage Vin is an input voltage value that is detected by the voltage detection circuit 66. Kpf is a power factor that is assumed for the apparatus overall. For example, in Embodiment 1 the power factor is taken as a fixed value of 90(%). This is chiefly determined depending on the current waveform of the power supply 64 and the waveform of the current supplied to the heater 100 by phase control of the driving circuit 70, and is the worst value obtained at the design stage. The current Ilimit is the effective value of current that must be limited with respect to the supply source. For example, in products intended for regions using 100 to 127 V as the mains supply, as the current Ilimit, 12 Arms is stored in advance in the ROM 32a as the setting value for the initial stage. In products intended for regions using 220 to 240 V as the mains supply, as the current Ilimit, 6 Arms is stored in advance in the ROM 32a as the setting value for the initial stage. In addition, it is also possible for a user to set the current Ilimit using an operation section (not illustrated in the drawing) of the image forming apparatus 90. For example, it is thus possible to appropriately correspond to the needs of a user which corresponds to a 20 A breaker, and also to the needs of a user who must limit the current to a lower current due to individual circumstances. The CPU 32 calculates the power Plimit that is suppliable to the heater 100 using the aforementioned parameters stored in the ROM 32a and the like.

Next, the CPU 32 calculates a power Pfsr that is assumed to be required by the heater 100 by means of the required power calculation unit 319. The power Pfsr is calculated based on the following three parameters and the information in Table 1. Table 1 includes information for determining the power Pfsr that is assumed to be required by the heater 100.

Current environment temperature
Detected by the temperature sensor 40.
Warmed-up level of fixing device 30
Determined by the warmed-up condition calculation unit 315 that calculates the degree of heat storage of the fixing device 30.
Average printing rate information for initial stage of printing
Printing rate is obtained by the printing rate obtaining part 316, and the average printing rate is determined by the printing rate averaging unit 317.

The required power calculation unit 319 determines the required power Pfsr based on a temperature inside the apparatus that is detected by the temperature sensor 40, a degree of heat storage of the fixing device 30 calculated by the warmed-up condition calculation unit 315, and a printing rate obtained by the printing rate obtaining part 316. Here, the respective printing rates of a predetermined number of the sheets 21 obtained by the printing rate obtaining part 316 are further used to determine an average printing rate by the printing rate averaging unit 317, and the power Pfsr is determined based on the average printing rate.

TABLE 1

| Required Power Calculation Table | | Average Printing Rate Information High Printing Rate Environment Temperature Level | | | | |
|---|---|---|---|---|---|---|
| | | −10° C. | 11° C.-15° C. | 16° C.-20° C. | 20° C.-25° C. | 26° C.- |
| Warmed-up Level Dx | 0 | 1100 W | 1000 W | 950 W | 900 W | 850 W |
| | 1 | 1000 W | 950 W | 900 W | 850 W | 800 W |
| | 2 | 950 W | 900 W | 850 W | 800 W | 750 W |

TABLE 1-continued

| | | | | | |
|---|---|---|---|---|---|
| 3 | 900 W | 850 W | 800 W | 750 W | 700 W |
| 4 | 850 W | 800 W | 750 W | 700 W | 650 W |
| 5 | 800 W | 750 W | 700 W | 650 W | 600 W |
| 6 | 750 W | 700 W | 650 W | 600 W | 600 W |

| Required Power Calculation Table | | Average Printing Rate Information Low Printing Rate Environment Temperature Level | | | | |
|---|---|---|---|---|---|---|
| | | –10° C. | 11° C.-15° C. | 16° C.-20° C. | 20° C.-25° C. | 26° C.- |
| Warmed-up Level Dx | 0 | 1000 W | 900 W | 850 W | 800 W | 750 W |
| | 1 | 900 W | 850 W | 800 W | 750 W | 700 W |
| | 2 | 850 W | 800 W | 750 W | 700 W | 650 W |
| | 3 | 800 W | 750 W | 700 W | 650 W | 600 W |
| | 4 | 750 W | 700 W | 650 W | 600 W | 550 W |
| | 5 | 700 W | 650 W | 600 W | 550 W | 500 W |
| | 6 | 650 W | 600 W | 550 W | 500 W | 500 W |

The values in Table 1 are design values obtained by studies which took into account variations in the performance of the fixing device 30, and are stored in advance as a table in the ROM 32a of the CPU 32. In Table 1, the power (W) assumed to be required by the heater 100 is determined according to the average printing rate information, the environment temperature level and the warmed-up level Dx. The methods for calculating these three parameters are described as follows. Note that it is assumed that the three parameters are respectively calculated concurrently, and are described as flows that are formed by branching the processing following S102 as illustrated in FIG. 5.

(Environment Temperature Level)

Environment temperature levels (11° C. to 15° C. and the like) that are on the abscissa axis in Table 1 represent the temperatures of external air. The temperature sensor 40 is disposed at a position in the image forming apparatus 90 at which the temperature sensor 40 can detect a temperature that is approximately equal to the temperature of the external air. In S103, the CPU 32 detects the temperature detected by the temperature sensor 40, as the environment temperature level.

(Warmed-Up Level Dx)

The warmed-up level Dx of the fixing device 30 that is on the axis of ordinates in Table 1 is calculated by the warmed-up condition calculation unit 315 based on a predicted temperature of the pressure roller 103 (hereunder, referred to as "predicted temperature") D and the temperature of the heater that is detected by the thermistor 54 when printing starts. First, the predicted temperature D of the pressure roller 103 is calculated by the following Formula (3).

$$D = D0 + \text{number of rotations during preparation operation for image formation} \times \Delta m - \text{number of continuously printed sheets} \times \Delta tp - \text{printing stopped time} \times \Delta tw \quad (3)$$

Here, D0 represents the initial temperature of the pressure roller 103, and in a case where a printing operation is started from a state in which the pressure roller 103 has cooled, the initial temperature of the pressure roller 103 is approximately room temperature. Further, in a case where a printing operation is started in a state in which the pressure roller 103 is warm, the predicted temperature D of the pressure roller 103 that is calculated at the time point at which the printing operation starts is used. Further, Δm represents a temperature by which the temperature of the pressure roller 103 increases each time the pressure roller 103 rotates once during a preparation operation for image formation (hereunder, referred to as "increasing temperature"). In addition, Δtp represents a temperature that is taken away by the relevant sheet 21 each time the pressure roller 103 prints one sheet. Further, Δtw represents a temperature (hereunder, referred to as "cooling temperature") by which the pressure roller 103 is cooled per unit time when printing is stopped.

In S104, the CPU 32 calculates the predicted temperature D of the pressure roller 103 based on Formula (3). The predicted temperature D of the pressure roller 103 is calculated based on the number of times the pressure roller 103 rotates during a preparation operation for image formation, the number of the sheets 21 printed continuously, and the time period for which printing was stopped.

In Embodiment 1, during a preparation operation for image formation, the increasing temperature Δm in the pressure roller 103 each time the pressure roller 103 rotates once is taken as, for example, 40° C. Further, the temperature Δtp that is taken away by the sheet 21 from the pressure roller 103 each time a single sheet is printed, is taken as, for example, 5° C. In addition, the cooling temperature Δtw per unit time when printing is stopped is taken as, for example, 1° C. The values of Δm, Δtp and Δtw are each taken as fixed values. For example, in a case where the image forming apparatus 90 of Embodiment 1 that is illustrated in FIG. 1 performed continuous printing of three sheets repeatedly for three times in a state where the initial temperature was 25° C. with an interval of five seconds between each round of printing, using Formula (3) the predicted temperature D of the pressure roller 103 after the end of printing is calculated as:

$$25° C. + 3 \text{ times} \times 40° C. - (3 \text{ sheets} \times 3 \text{ times} \times 5°) C. - (5 \text{ secs} \times 2 \text{ times} \times 1°) C. = 90° C.$$

The values of Δm, Δtp and Δtw are not limited to fixed values. For example, when greater accuracy is required, the values may be adjusted depending on the environment temperature or thermistor temperature, the warmed-up condition, and the number of sheets that are consecutively conveyed (hereunder, referred to as "number of sheets that pass through") and the like.

Next, in S105, the CPU 32 detects the temperature of the heater 100 by means of the thermistor 54. In S106, the CPU 32 refers to Table 2 to determine the warmed-up level Dx of the fixing device 30 based on the predicted temperature D of the pressure roller 103 calculated in S104 and the temperature of the heater 100 detected in S105.

TABLE 2

| Warmed-up Level Dx Calculation Table | | Temperature of Heater | | | |
|---|---|---|---|---|---|
| | | 0° C.-80° C. | 81° C.-110° C. | 111° C.-140° C. | 141° C.- |
| Predicted Temperature D | 0° C.-80° C. | 0 | 1 | 2 | 3 |
| | 81° C.-110° C. | 1 | 2 | 3 | 4 |
| | 111° C.-140° C. | 2 | 3 | 4 | 5 |
| | 141° C.- | 3 | 4 | 5 | 6 |

Table 2 is a table for determining the warmed-up level Dx of the fixing device 30, and is used to determine the warmed-up level Dx based on the predicted temperature D of the pressure roller 103 and the temperature of the heater 100. For example, in a case where the predicted temperature D of the pressure roller 103 is 100° C. and the temperature of the heater 100 is 90° C., the warmed-up level Dx of the fixing device 30 is determined as "2".

Note that, the higher that the predicted temperature D of the pressure roller 103 is, the greater the amount of the stored heat of the pressure roller 103 will be and the smaller the power amount with which fixing can be performed. Similarly, the higher that the temperature of the heater 100 is, the greater the amount of the stored heat of the fixing film 102 will be and the smaller the power amount with which fixing can be performed. Therefore, in Table 2, the higher the values for the temperature of the heater 100 and the predicted temperature D of the pressure roller 103 are, the higher the numerical value (the higher level) to which the warmed-up level Dx is set.

(Average Printing Rate Information)

Figure 6:
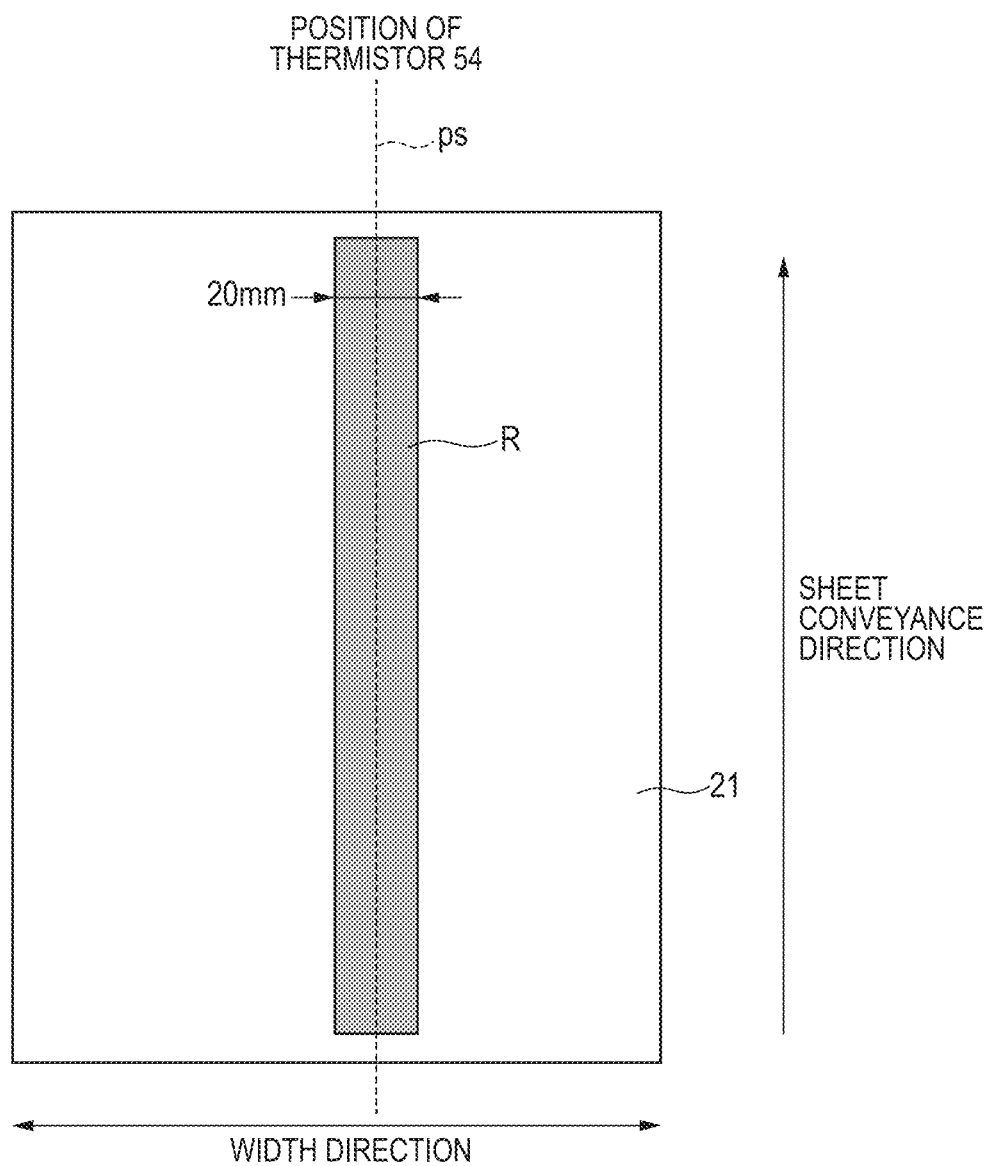
FIG. 6 is a view illustrating a range when determining a printing rate in Embodiment 1.

FIG. 6 is a view for describing the printing rate of sheets. A region having a predetermined width in the width direction that is centered on a virtual position ps on the sheet 21 that corresponds to the position at which the thermistor 54 is disposed, and having a length from the leading edge to the trailing edge of the sheet 21 with respect to the conveyance direction is taken as a region R. Note that the term "width direction" refers to a direction that is orthogonal to the conveyance direction. The printing rate information shown on the abscissa axis in Table 1 is the printing rate for a toner image that is transferred onto the region R of the sheet 21. Specifically, the printing rate information is information for an average printing rate for one sheet with respect to the image portion illustrated in FIG. 6. Here, the term "average printing rate" refers to the total value of the density percentages of each color. For example, in a case where the region R shown in FIG. 6 is an image in which the density of magenta is 100% and the density of cyan is 100% (hereunder, referred to as "secondary color solid image"), the average printing rate is 200% (=100%+100%). For example, in a case where the secondary color solid image is printed on one half of the region R, the average printing rate will be 100% (=200%÷2). Information for the average printing rate in the region R in one sheet (hereunder, also referred to as "average printing rate information") is calculated by obtaining printing rate information by means of the printing rate obtaining part 316 and averaging the printing rates by means of the printing rate averaging unit 317.

Temperature control of the heater 100 of the fixing device 30 is performed based on the detection result of the thermistor 54. If the printing rate at the position of the thermistor 54 is high, the temperature at the position of the thermistor 54 is liable to decrease. Therefore, as the temperature control of the heater 100, the CPU 32 controls to supply a large amount of power so as not to lower the temperature at the position of the thermistor 54. On the other hand, if the printing rate at the position of the thermistor 54 is low, the CPU 32 performs feedback control so that the power amount that is supplied is reduced, which is the opposite of the aforementioned control.

First, in S107, by means of the printing rate obtaining part 316 and the printing rate averaging unit 317, the CPU 32 obtains average printing rate information for each of a predetermined number of sheets from the first sheet in the print job, for example, for each of the first three sheets of the print job (amount for predetermined number of sheets). In S108, with respect to the average printing rate information for three sheets, the CPU 32 takes a case where the average printing rate information is 70% or more as being a case of a high printing rate and takes a case where the average printing rate information is less than 70% as being a case of a low printing rate, and determines whether or not printing at a high printing rate was performed for even one sheet among the three sheets by means of the number-of-sheet obtaining unit 318. Note that, the above three sheets as the number of sheets is one example, and the number of sheets for which average printing rate information is obtained is not limited to three sheets. The reason three sheets are adopted as the number of sheets in Embodiment 1 is as follows. As described later, in some cases readjustment is performed in which the conveyance interval between the sheets 21 is shortened or lengthened depending on the result of determining the power after the start of printing. In such a case, there are sheets 21 that are already being conveyed into the image forming apparatus 90, and formation of toner images on the photosensitive drums 13 that are to be transferred onto the sheets 21 has already been performed. The conveyance interval between these sheets that are already being conveyed cannot be changed. For example, in the image forming apparatus 90 of Embodiment 1, it is assumed that the number of the sheets 21 for which the conveyance interval cannot be changed in a case where readjustment is performed is three sheets. The number of sheets in this case is not limited to three sheets, and the number of sheets is decided depending on the individual image forming apparatuses. Since the control to switch the conveyance interval is actually executed after the three sheets that are already being conveyed inside the apparatus are delivered, the shortest time in which switching of the conveyance interval is performed is from the time that three images are printed after it has been determined to switch the conveyance interval.

In S108, if it is determined that even one sheet among the three sheets is a sheet with a high printing rate, the CPU 32 advances the processing to S109. In S109, as a parameter to be used when determining the power Pfsr that is assumed to be required by the heater 100, the CPU 32 sets the printing rate mode to the high printing rate mode. In S108, if it is determined that not even one sheet among the three sheets is a sheet with a high printing rate, the CPU 32 advances the processing to S110. In S110, as a parameter to be used when determining the power Pfsr that is assumed to be required by the heater 100, the CPU 32 sets the printing rate mode to the low printing rate mode.

As described above, three parameters that are necessary for determining the power Pfsr that is assumed to be required by the heater 100, namely, the environment temperature level, the warmed-up level Dx and the printing rate information are determined.

In S111, by means of the required power calculation unit 319, the CPU 32 determines the power Pfsr that is assumed to be required by the heater 100 based on the three parameters that are the environment temperature level, the warmed-up level Dx and the printing rate mode (average printing rate information) and also based on Table 1. For example, in a case where the environment temperature level is 18° C., the warmed-up level Dx is 2 and the printing rate mode is the low printing rate mode, the CPU 32 determines the power Pfsr that is assumed to be required by the heater 100 as 750 W based on Table 1. In S112, using the power Plimit that is suppliable to the heater 100 calculated in S102 and the power Pfsr that is assumed to be required by the heater 100 that is determined in S111, the CPU 32 calculates a difference ΔPini between the aforementioned powers (hereunder, referred to as "differential power") by means the following Formula (4).

$$\Delta Pini = Plimit - Pfsr \quad (4)$$

In S113, the CPU 32 determines whether or not the differential power ΔPini calculated in S112 is 0 W or more. If the CPU 32 determines in S113 that the differential power ΔPini is 0 W or more, the CPU 32 advances the processing to S114. In S114, the CPU 32 executes printing in a normal mode (first mode). The normal mode is a printing mode in which an operation for reducing power as is performed in a power saving mode (second mode) that is described later is not performed. If the CPU 32 determines in S113 that the differential power ΔPini is less than 0 W, the CPU 32 advances the processing to S115. In S115, the CPU 32 executes printing in a power saving mode.

(2) Power Saving Mode Selection Processing

Next, in the determination processing illustrated in FIG. 5, in a case where it is determined to execute printing in a power saving mode, the CPU 32 determines which power saving mode to start printing in based on the differential power ΔPini calculated in S112 of FIG. 5. The image forming apparatus 90 in Embodiment 1 has a first to a third control that reduce the power that is required by the heater 100. The first control is control that delays the start of image formation for the first sheet (extends a heat generation period of the heater before printing starts) to thereby warm-up the entire fixing device to a greater extent before executing a fixing process. In Embodiment 1, the start of image formation for the first sheet is delayed by extending the time period of a preparation operation for image formation. By storing a large amount of heat in advance in the pressure roller 103 that has a large thermal capacity, an effect is achieved of decreasing the power required during a period in which a sheet is passing through the fixing nip portion N. However, there is the problem that a first print out time (hereunder, abbreviated as "FPOT") until discharge of the first sheet 21 is completed lengthens. Hereinafter, the first control is referred to as "FPOT extension control".

The second control is control that widens the conveyance interval between the sheets 21. The term "widen the conveyance interval between the sheets 21" refers to widening the interval (hereunder, referred to as "sheet interval") between the trailing edge of the preceding sheet that is being conveyed and the leading edge of the following sheet 21 that is being conveyed. When an unfixed toner image is fixed onto one sheet 21, heat is taken away from both the fixing film 102 and the pressure roller 103 by the sheet 21. By utilizing the time period of the widened sheet interval to compensate for the heat amount that was taken away by the sheet 21, the average power is decreased. The sheet interval of a print job which was started after widening the sheet interval can be easily reduced. Therefore, it is easy to respond to changes in the throughput during printing as described later. On the other hand, the amount by which the power is reduced is small in comparison to a case where the printing speed is lowered and the power is reduced as in the third control that is described later. Therefore, when attempting to reduce the power by a large amount, it is necessary to provide a sheet interval that is large to a certain degree at the initial stage of printing.

The third control is control that makes the image forming speed (that is, the printing speed) slower (slows the rotational speed of the photosensitive drum and conveying rollers or the like) than the image forming speed during the normal mode. By slowing the printing speed, the power that is required per unit time during the fixing process decreases. The control that slows the printing speed is the most effective as control for reducing the required power. On the other hand, in a case where surplus power is generated after printing was started and it is attempted to return the throughput to the same state as in the normal mode by returning the printing speed to the speed in the normal mode, it is necessary to temporarily stop the image forming operation and change the operating speed of the apparatus overall. Therefore, when returning the throughput to the same state as in the normal mode, a control issue arises whereby a time loss of several seconds occurs.

Thus, the first control to third control each have advantages and disadvantages, and which of these controls is the optimal control differs depending on the state of the image forming apparatus 90 and the print job. In Embodiment 1, taking into consideration the characteristics of the three controls, a time by which to extend the heat generation period of the heater before the start of printing (hereunder, referred to as "extension time (before printing starts)") (s) and an extension time of the sheet interval at the initial stage of printing (hereunder, referred to as "extension time (sheet interval)") (s), and also the speed of image formation (printing speed) are determined based on Table 3 according to the differential power ΔPini. The extension time (sheet interval) (s) is a time period that is added to the sheet interval (s) when in the normal mode.

TABLE 3

| Differential Power ΔPini | Extension Time (Before Start of Printing) (s) | Extension Time (Sheet Interval) (s) | Printing Speed |
|---|---|---|---|
| Δ Pini ≥ 0 W | 0 | 0 | Normal Speed |
| 0 W > Δ Pini ≥ −20 W | 1 | 0 | Normal Speed |
| −20 W > Δ Pini ≥ −40 W | 2 | 0 | Normal Speed |
| −40 W > Δ Pini ≥ −60 W | 3 | 0 | Normal Speed |
| −60 W > Δ Pini ≥ −80 W | 4 | 0 | Normal Speed |
| −80 W > Δ Pini ≥ −100 W | 5 | 0 | Normal Speed |
| −100 W > Δ Pini ≥ −125 W | 5 | 0.50 | Normal Speed |
| −125 W > Δ Pini ≥ −150 W | 5 | 1.00 | Normal Speed |
| −150 W > Δ Pini ≥ −175 W | 5 | 1.25 | Normal Speed |
| −175 W > Δ Pini ≥ −200 W | 5 | 1.50 | Normal Speed |
| −200 W > Δ Pini | 0 | 0 | Low Speed |

For example, in a case where the differential power ΔPini calculated in S112 of FIG. 5 is −50 W, based on Table 3, printing is executed in a power saving mode in which the extension time (before printing starts) of the preparation operation for image formation is made 3 s, the extension time (sheet interval) is made 0 s, and the printing speed is made the normal speed.

(Power Saving Mode Selection Processing)

Control in a case where printing is executed in the power saving mode in S115 of FIG. 5 will now be described using the flowchart of FIG. 7. In a case where printing by means of the power saving mode in S115 is selected as a result of the determination in S113 of FIG. 5, the processing from S120 onward is executed. In S120 the CPU 32 determines whether or not the differential power ΔPini is equal to or greater than −100 W. If the CPU 32 determines in S120 that the differential power ΔPini is equal to or greater than −100 W, in S122 the CPU 32 determines that extension of the FPOT is to be performed, and thereafter a normal printing operation (the extension time (sheet interval) is 0 s, and the printing speed is the normal speed) is executed. In S123, based on the differential power ΔPini and Table 3, the CPU 32 determines the FPOT extension, that is, the extension time of the preparation operation for image formation, and in S127 the CPU 32 starts printing by means of the power saving mode.

In a case where the CPU 32 determined in S120 that the differential power ΔPini is less than −100 W, the CPU 32 advances the processing to S121. In S121, the CPU 32 determines whether or not the differential power ΔPini is equal to or greater than −200 W. If the CPU 32 determines in S121 that the differential power ΔPini is equal to or greater than −200 W, the CPU 32 advances the processing to S124. In S124, the CPU 32 determines that extension of the FPOT and extension of the sheet interval is to be performed, and executes printing in the power saving mode. In S125, the CPU 32 determines the extension of the FPOT, that is, the extension time of the preparation operation for image formation, based on the differential power ΔPini and Table 3. Further, based on the differential power ΔPini and Table 3, the CPU 32 determines the sheet interval extension time for the start of printing, and in S127 the CPU 32 starts printing by the power saving mode.

If the CPU 32 determines in S121 that the differential power ΔPini is smaller than −200 W (that is, that there is a significant shortage of power), the CPU 32 advances the processing to S126. In S126, the CPU 32 executes the image forming operation at a low speed as a power saving mode with less consumed power, as shown in Table 3. In this case, the CPU 32 sets the extension time of the preparation operation for image formation to 0 seconds, sets the extension time of the sheet interval to 0 seconds, and sets the printing speed to a low speed that is slower than the normal speed by means of the speed control unit 310, and starts printing by means of the power saving mode in S127.

(3) Processing to Determine Throughput Change Necessity after Printing Starts

Next, the operations performed after starting printing in a power saving mode in which the sheet interval has been extended (S125 and S127 of FIG. 7) are described. In a case where printing was started that uses the sheet interval extension time (s) that was determined by a determination made in the initial stage based on the differential power ΔPini and Table 3, control for determining the next sheet interval extension time is performed in a continuous manner during printing also. The aforementioned control will now be described using the flowchart of FIG. 8. Upon printing being started in the power saving mode that extends the sheet interval, the processing from S140 onward is executed. In S140, a variable N for counting the number of printing sheets is set to "1". In S141, the CPU 32 determines whether or not the variable N for the number of printing sheets is less than 3. If the CPU 32 determines in S141 that the variable N for the number of printing sheets is less than 3, the CPU 32 proceeds to the processing in S142. In S142, the CPU 32 executes a printing operation, and in S143 the CPU 32 measures the power actually consumed in the printing operation (hereunder, referred to as "consumption power") for the $N^{TH}$ sheet by means of the power measurement unit 308. The power measurement unit 308 measures the power which the heater 100 actually consumed in the printing operation for the $N^{TH}$ sheet based on the input voltage of the AC power supply 50 that is detected by the voltage detection circuit 66, and the current flowing to the heater 100 that is detected by the current detection circuit 68. Note that the CPU 32 stores the measured consumption power in, for example, the RAM 32b. While continuing the printing operations until the number of printing sheets N is three sheets, the CPU 32 measures the actual consumption power which the heater 100 consumes in the printing operations for each single sheet. Note that, although three sheets are taken as the basis for the determination in S141, as described above this value is a value that is decided depending on each individual image forming apparatus 90.

In S144, the CPU 32 determines whether or not printing has finished. If the CPU 32 determines in S144 that printing finished, the CPU 32 ends the processing. For example, in the case of a print job that finished after printing one sheet or two sheets, the printing finishes at the time point at which printing of one sheet or two sheets is finished. On the other hand, if the CPU 32 determines in S144 that printing is not finished, in S145 the CPU 32 adds 1 to the variable N for the number of printing sheets (N=N+1), and returns to the processing in S141. For example, in a case where printing continued for three sheets or more, the variable N for the number of printing sheets will be 3, and as a result of the determination made in S141 the CPU 32 will transition to processing for predicting the power assumed to be required by the heater 100 from S146 onwards (S146 to S155).

If the CPU 32 determines in S141 that the number of printing sheets N is 3 or more, the CPU 32 advances the processing to S146. In S146, in order to perform a calculation to predict the power assumed to be required by the heater 100, the CPU 32 calculates the average value of the actual consumption power of the heater for the past three sheets. In this case, when the consumption power for the $N^{TH}$ sheet measured in S143 is represented by $P_N$, the consumption power for the $N-1^{TH}$ sheet is represented by $P_{N-1}$ and the consumption power for the $N-2^{TH}$ sheet is represented by $P_{N-2}$, the CPU 32 calculates the average value of the consumption powers $P_N$, $P_{N-1}$ and $P_{N-2}$ by means of the power averaging unit 320. In S147, based on printing rate information for the past three sheets which are the $N^{TH}$ sheet, $N-1^{TH}$ sheet and $N-2^{TH}$ sheet, the CPU 32 obtains the number of sheets for which the printing rate is a high printing rate among the three sheets by means of the number-of-sheet obtaining unit 318, and stores the obtained value as "M" in the RAM 32b. In S148, the CPU 32 obtains average printing rate information for the next (future) three sheets ($N+1^{TH}$ sheet, $N+2^{TH}$ sheet and $N+3^{TH}$ sheet) by means of the printing rate obtaining part 316 based on image information. The average printing rate information is the information described above referring to FIG. 6.

In S149, by means of the number-of-sheet obtaining unit 318, the CPU 32 determines whether or not there is even one sheet with a high printing rate among the average printing rate information for the $N+1^{TH}$ sheet, $N+2^{TH}$ sheet and $N+3^{TH}$ sheet obtained in S148. If the CPU 32 determines in S149 that there is even one sheet that has a high printing rate, the CPU 32 advances the processing to S150. In S150, the CPU 32 sets the high printing rate mode as the mode for printing the next three sheets. Hereinafter, the power assumed to be required by the heater 100 during printing for the next three sheets is referred to as "predicted required power $P_{NEXT}$". In S151, the CPU 32 determines the predicted required power $P_{NEXT}$ that is required in the high printing rate mode by the following Formula (5), and advances the processing to S154.

$$P_{NEXT}=\{(P_N+P_{N-1}+P_{N-2})+P_{H-L}\times(3-M)\}/3 \qquad (5)$$

Here, M represents the number of sheets with a high printing rate among the past three sheets mentioned above. Further, $P_{H-L}$ represents a power difference between power consumed in a high printing rate and power consumed in a low printing rate, and in Embodiment 1 a fixed value, for example, 80 W, that is obtained in advance by conducting a study is used. Thus, the CPU 32 calculates the power $P_{NEXT}$ that is assumed to be required next by the heater 100 based on the average value of the power consumed during printing of a predetermined number of sheets that was actually measured when subjecting a past predetermined number of the sheets 21 to a fixing process, and the printing rate of toner images for a predetermined number of sheets to be printed next.

If the CPU 32 determines in S149 that there is not even one sheet with a high printing rate, the CPU 32 advances the processing to S152. In S152 the CPU 32 sets the low printing rate mode as the mode for printing the next three sheets. In S153, by means of the following Formula (6), the CPU 32 determines the predicted required power $P_{NEXT}$ that is required when printing in the low printing rate mode, and then advances the processing to S154.

$$P_{NEXT}=\{(P_N+P_{N-1}+P_{N-2})-P_{H-L}\times M\}/3 \qquad (6)$$

Here, M and $P_{H-L}$ represent the same values as in Formula (5), and a description thereof is therefore omitted.

(Specific Example of Calculation of Predicted Required Power $P_{NEXT}$)

Figures 9A, 9B:
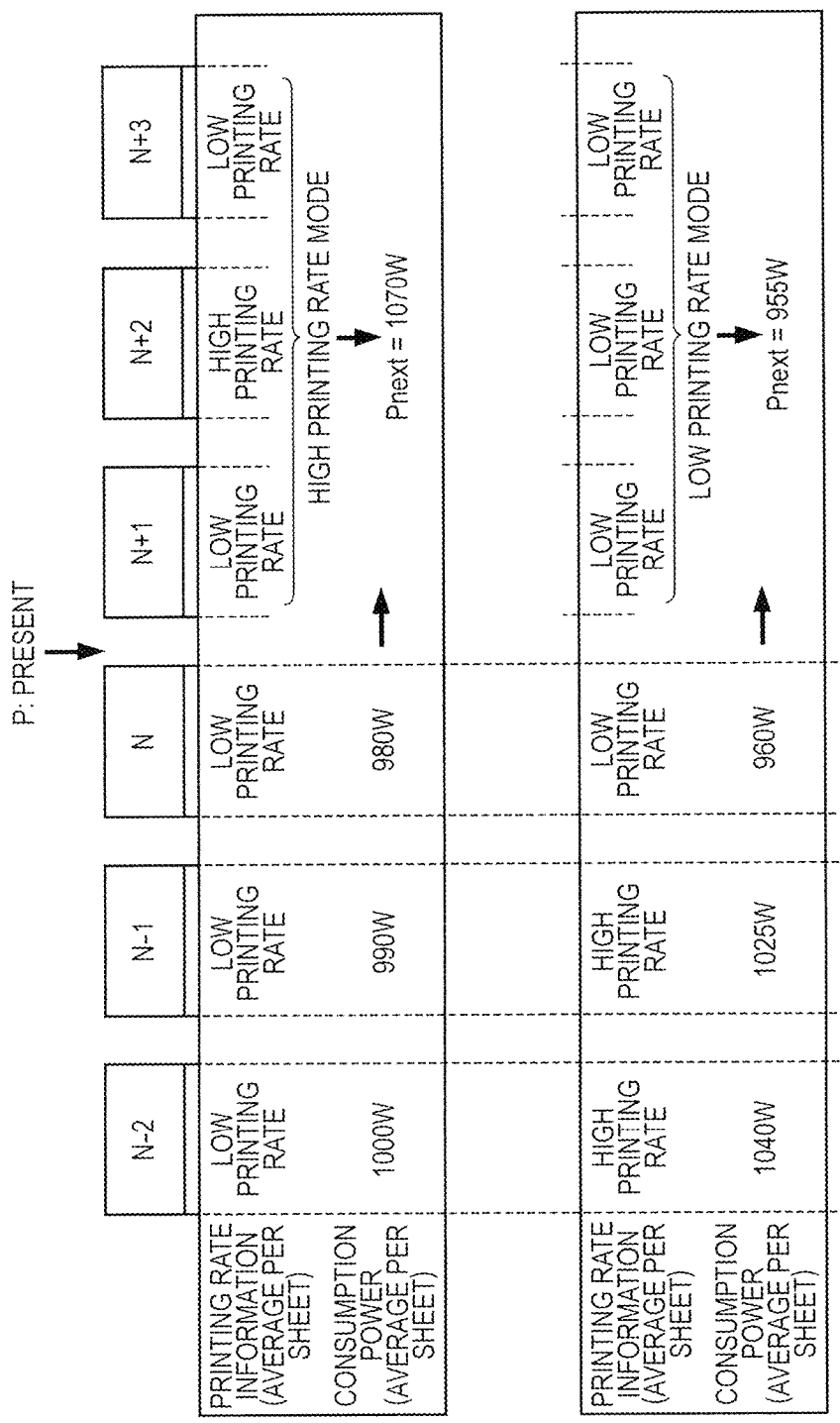
FIG. 9A and FIG. 9B are views that illustrate processing for determining whether it is necessary to change the throughput after printing starts of Embodiment 1.

A specific example of calculating the predicted required power $P_{NEXT}$ will now be described referring to FIG. 9A and FIG. 9B. FIG. 9A and FIG. 9B illustrate an example in which a time point P represents the present, an N-2$^{TH}$ sheet represents a sheet 21 that was three sheets prior to the current sheet, an N-1$^{TH}$ sheet represents a sheet 21 that was two sheets prior to the current sheet, and an N$^{TH}$ sheet represents a sheet 21 that was one sheet prior to the current sheet. Printing rate information (average per sheet) (low printing rate, high printing rate or the like) and a consumption power (average per sheet) measured by the power measurement unit 308 are described for each of the sheets 21. Further, printing rate information for three sheets that are scheduled that is scheduled to be printed next is described for an N+1$^{TH}$ sheet to an N+3$^{TH}$ sheet.

In a case A that is illustrated in FIG. 9A, high printing rate information exists (N+2$^{TH}$ sheet) among the printing rate information for the next three sheets. Therefore, as the predicted required power $P_{NEXT}$ in S151 of FIG. 8, the predicted required power $P_{NEXT}$ for printing in the high printing rate mode is calculated using Formula (5). Based on the printing rate information (M=0) and results of power measurement for the past three sheets, the predicted required power $P_{NEXT}$ that will be required thereafter is calculated as follows:

$$P_{NEXT}=\{(980+990+1000)+80\times(3-0)\}/3=1070(W).$$

In a case B that is illustrated in FIG. 9B, high printing rate information does not exist for even one sheet among the printing rate information for the next three sheets. Therefore, as the predicted required power $P_{NEXT}$ in S151 of FIG. 8, the predicted required power $P_{NEXT}$ for printing in the low printing rate mode is calculated using Formula (6). Based on the printing rate information (M=2) and results of power measurement for the past three sheets, the predicted required power $P_{NEXT}$ that will be required thereafter is calculated as follows:

$$P_{NEXT}=\{(960+1025+1040)-80\times2\}/3=955(W).$$

In Embodiment 1 a configuration is described in which the formula to be used for calculating the predicted required power $P_{NEXT}$ is selected according to whether or not the printing rate information for the next three sheets is the high printing rate. However, a configuration may also be adopted that calculates the predicted required power $P_{NEXT}$ based on the printing rate information [%] for the next three sheets. For example, the predicted required power $P_{NEXT}$ that will be required is calculated by the following Formula (7) based on printing rate information $I_N$, $I_{N-1}$ and $I_{N-2}$ and the results of power measurement for the past three sheets and also printing rate information $I_{N+1}$, $I_{N+2}$ and $I_{N+3}$ for the next three sheets.

$$P_{NEXT}=(P_N P_{N-1} P_{N-2})/3+P_{INK}\times\{(I_N+I_{N-1}+I_{N-2})-(I_{N-1}+I_{N+2}+I_{N+3})\}/3 \qquad (7)$$

Here, $P_{INK}$ represents a power difference when the printing rate information changed by 1%.

The description will now return to the flowchart of FIG. 8. In S154, the CPU 32 calculates a differential power $\Delta P_{N+1}$ based on the power Plimit that is suppliable to the heater 100 which was calculated in S102 of FIG. 5, and the predicted required power $P_{NEXT}$ calculated in S151 or S153. The differential power $\Delta P_{N+1}$ is determined by the following Formula (8).

$$\Delta P_{N+1}=Plimit-P_{NEXT} \qquad (8)$$

In S155, the CPU 32 determines whether to shorten or extend the sheet interval (s) depending on the value of the differential power $\Delta P_{N+1}$. A table used for determining whether to shorten or extend the sheet interval is illustrated in Table 4, and is stored in advance in the ROM 32a inside the CPU 32.

TABLE 4

| Differential Power $\Delta P_{N+1}$ | Extension Time (Sheet Interval) (s) |
|---|---|
| $\Delta P_{N+1} \geq 0$ W | 0 |
| $0$ W $> \Delta P_{N+1} \geq -20$ W | 0.1 |
| $-20$ W $> \Delta P_{N+1} \geq -40$ W | 0.2 |
| $-40$ W $> \Delta P_{N+1} \geq -60$ W | 0.2 |
| $-60$ W $> \Delta P_{N+1} \geq -80$ W | 0.3 |
| $-80$ W $> \Delta P_{N+1} \geq -100$ W | 0.4 |
| $-100$ W $> \Delta P_{N+1} \geq -125$ W | 0.5 |
| $-125$ W $> \Delta P_{N+1} \geq -150$ W | 1.00 |
| $-150$ W $> \Delta P_{N+1} \geq -175$ W | 1.25 |
| $-175$ W $> \Delta P_{N+1} \geq -200$ W | 1.50 |
| $-200$ W $> \Delta P_{N+1}$ | 2.00 |

For example, in a case where the differential power $\Delta P_{N+1}$ calculated in S154 is -160 W, the CPU 32 determines to extend the sheet interval by 1.25 seconds based on Table 4.

[Case where Printing was Started at Low Speed]

Figure 10:
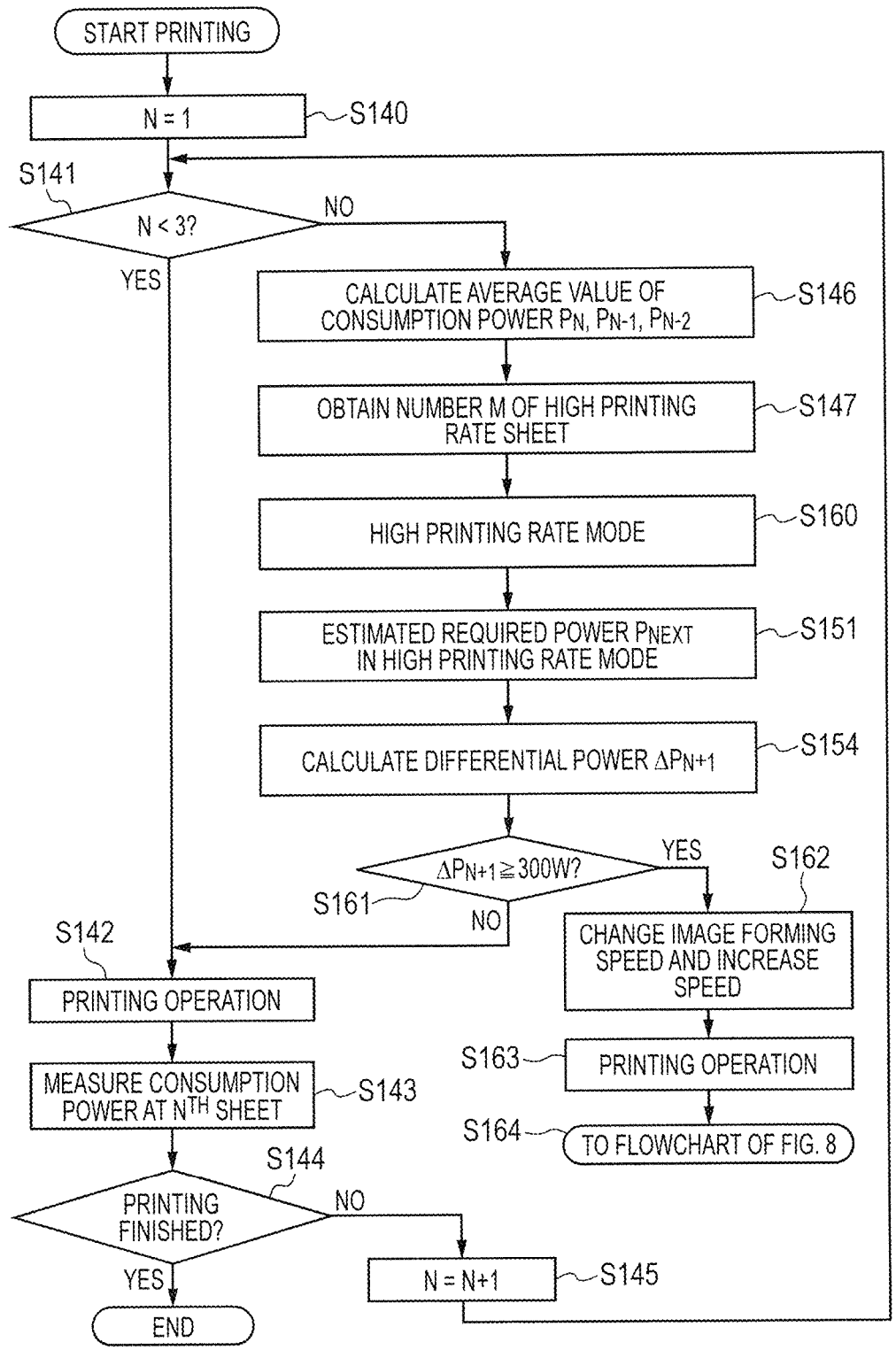
FIG. 10 is a flowchart illustrating processing for determining whether to change the printing speed after printing starts of Embodiment 1.

In the foregoing description, operations performed after printing was started in a power saving mode in which the sheet interval was extended are described. Next, operations performed after printing was started in a power saving mode with a low speed (S126 and S127 in FIG. 7) are described using the flowchart of FIG. 10. In FIG. 10, processing that is the same as processing in FIG. 8 is denoted by the same step numbers as in FIG. 8, and a description of such processing is omitted. The processing in S160 to S164 that is different from the processing in FIG. 8 will be described.

The process for calculating the power is that same as at a time of the power saving mode in which the sheet interval is extended. In the case of the power saving mode with a low speed, when it is determined in the course of printing that the power is sufficient, driving of the image forming apparatus 90 is temporarily stopped during a sheet interval of the print job, and image formation is then resumed once more at a faster printing speed than prior to stopping. A certain amount of time is required for this process, and if this process is executed frequently it will result in a decrease in productivity. Therefore, when transitioning from the power saving mode at a low speed to the power saving mode at normal speed or to the normal mode, it is important to make a determination to switch to printing at a high speed if it is determined that there is sufficient surplus power.

In S160, without relying on the image information for the three sheets to be printed thereafter, the CPU 32 assumes that power for a case of printing in the high printing rate mode is required, and sets the printing rate mode to the high printing rate mode. Calculation of the predicted required power $P_{NEXT}$ and the differential power $\Delta P_{N+1}$ is the same as in S151 and S154. That is, the CPU 32 calculates the predicted required power $P_{NEXT}$ using Formula (5) for the time of the high printing rate mode. In S161, the CPU 32 determines whether or not the differential power $\Delta P_{N+1}$ calculated in S154 is 300 W or more, that is, whether or not there is sufficient surplus power. If the CPU 32 determines in S161 that the differential power $\Delta P_{N+1}$ is 300 W or more, the CPU 32 advances the processing to S162. In S162, the CPU 32 determines that there is sufficient surplus power, and changes the image forming speed (printing speed) by means of the speed control unit 310 to switch to high-speed printing (increase the speed). Here, the value 300 W that is used for the determination in S161 is merely an example, and the value used for the determination in S161 is not limited to 300 W.

The image forming apparatus of Embodiment 1 has a configuration that sets the low-speed power saving mode when the power is insufficient by 200 W, as shown in Table 3. In consideration of this fact, 300 W that is a power value obtained by adding a small margin to the numerical value 200 W is adopted as a threshold value when making a determination with respect to changing the speed. Further, in the case of a configuration in which the remaining number of sheets of the print job is known, it is desirable to perform control that does not switch the image forming speed if the remaining number of printing sheets is small. That is, a configuration may be adopted that determines whether or not to switch the printing speed based on the predicted required power $P_{NEXT}$ and the remaining number of printing sheets in the print job.

In S163, the CPU 32 continues the printing operation after having changed the image forming speed (increased the speed) in S162. In S164, the CPU 32 transitions to the flowchart of FIG. 8. Note that, in the processing in S164 of FIG. 10, as a precaution, the CPU 32 performs control to transition to the flowchart of FIG. 8 so as to check the power thereafter also, and to adjust the sheet interval as necessary. However, since this processing is after an adequate margin has been secured with respect to the power and switching of the image forming speed was performed, a configuration may also be adopted in which the printing operation is continued as it is without transitioning to the flowchart of FIG. 8 in S164 and without checking the power thereafter.

In a case where the control described above is performed, in an apparatus in which it is necessary to start image formation at a lower throughput than the maximum throughput due to a limitation with respect to the power of the AC power supply 50, selection of the optimal power saving mode is performed according to the amount of shortage in the power. By this means, it is possible to provide the maximum productivity possible to the user. Thus, according to Embodiment 1, the optimal power saving mode can be selected according to the power conditions or printing conditions, and productivity can be improved to the fullest extent possible.

Embodiment 2

In Embodiment 1, selection of a power saving mode is performed based on only the differential power $\Delta Pini$. In Embodiment 2, an example is described in which selection of a power saving mode is performed using the differential power $\Delta Pini$ and parameters of information that relates to the total printing number of sheets of the print job.

[Relation Between Number of Printing Sheets and Printing Required Time]

Figure 11:
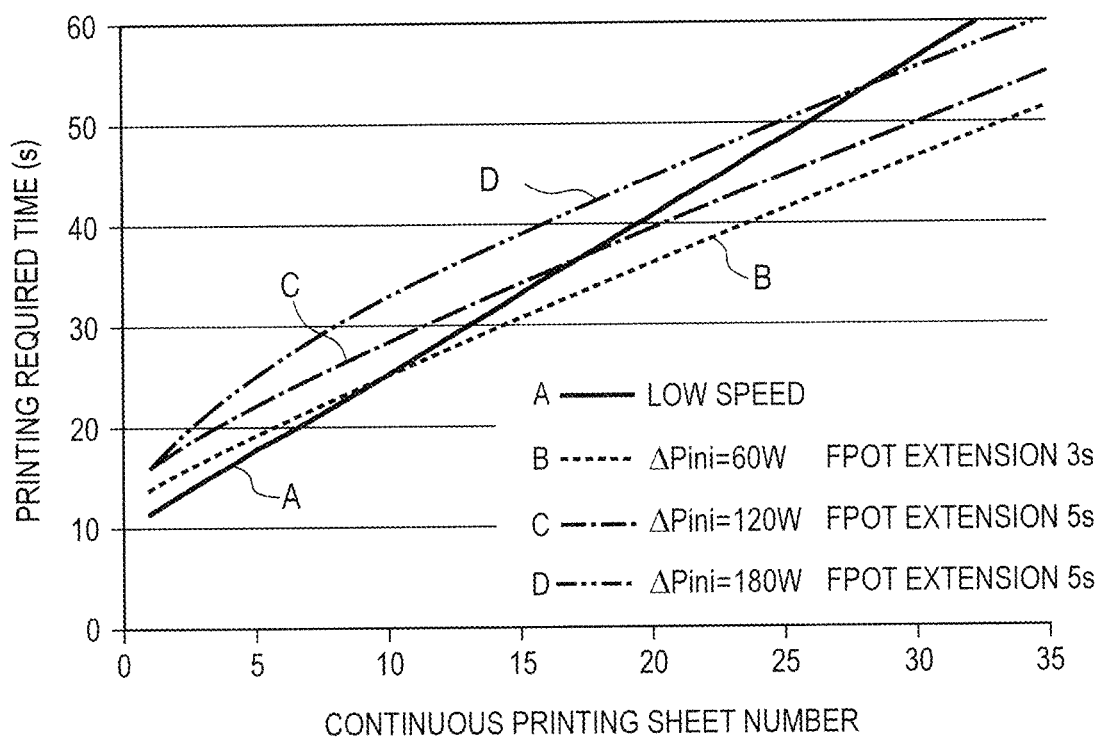
FIG. 11 is a view illustrating a printing required time in each power saving mode of Embodiment 2.

FIG. 11 shows a graph in which the continuous printing number of sheets (sheets) is shown on the abscissa axis, and the time required for printing (printing required time) (s) is shown on the axis of ordinates. A plotted line represented as a solid line A represents the printing required time in a case where printing is started at a low speed. On the other hand, a dotted line B represents transitions in the printing required time in a case where, as one example, after the FPOT is extended by three seconds when the differential power $\Delta Pini$ is 60 W, the sheet interval is extended and printing starts, and thereafter the sheet interval is shortened. With regard to the solid line A and the dotted line B, in the case represented by the solid line A in which printing is performed at a low speed while the number of printing sheets is small, the print job finishes earlier than in the case represented by the dotted line B in which the sheet interval is extended and thereafter the sheet interval is gradually shortened. On the other hand, it will be understood from the graph that when the number of printing sheets is large, the print job will finish earlier by performing a printing operation represented by the dotted line B in comparison to the case represented by the solid line A.

Similarly, an alternate long and short dash line C represents an example in which the FPOT is extended by five seconds when the differential power $\Delta Pini$ is 120 W, and furthermore the sheet interval is extended and printing is started, and a chain double-dashed line D represents an example in which the FPOT is extended by five seconds when the differential power $\Delta Pini$ is 180 W, and furthermore the sheet interval is extended and printing is started. Although the respective points of intersection with the solid line A differ depending on the amount of the differential power $\Delta Pini$, in a case where the number of printing sheets is small, the finished sheets after printing can be provided to the user earlier in the case where printing is started in the power saving mode at a low speed.

[Power Saving Mode Selection Processing]

Figure 12:
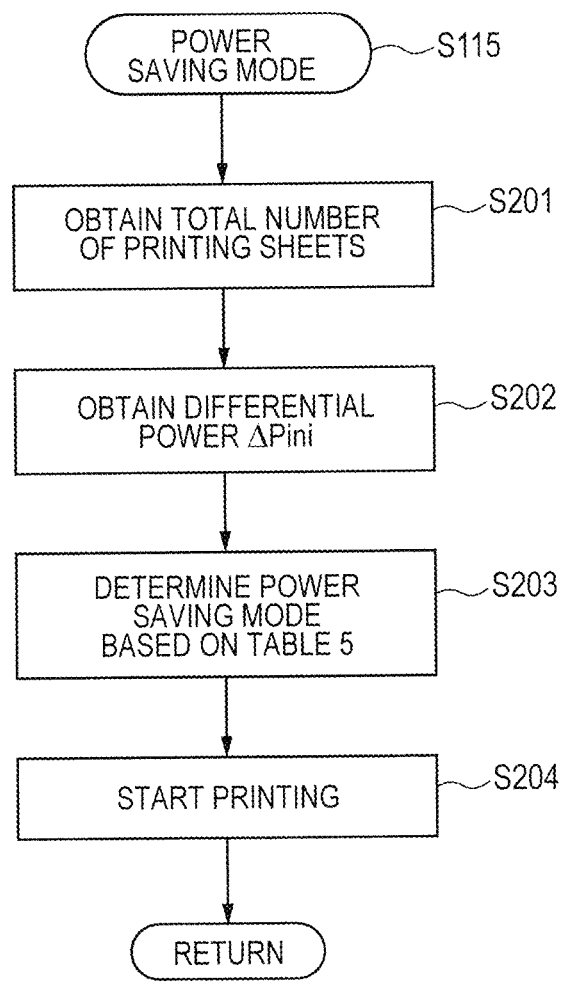
FIG. 12 is a flowchart illustrating processing for selecting a power saving mode of Embodiment 2.

In Embodiment 2, the configuration of the image forming apparatus 90, (1) the processing for determining power supply availability and (3) the processing to determine the throughput change necessity after printing starts are the same as in Embodiment 1, and hence a description thereof is omitted here. Using FIG. 12, (2) power saving mode selection processing that is different in Embodiment 2 in comparison to Embodiment 1 will now be described. In the processing for determining power supply availability illustrated in FIG. 5, when the power saving mode is required in S115, the processing from S201 onward in FIG. 12 is executed.

In S201, the CPU 32 obtains information regarding the total printing number of sheets of one print job. In S202, the CPU 32 obtains the value of the differential power ΔPini calculated in S112 of FIG. 5. In S203, the CPU 32 determines the power saving mode using Table 5 based on the differential power ΔPini obtained in S202.

TABLE 5

| Differential Power Δ Pini | Total Printing Number of sheets of Job | | | |
|---|---|---|---|---|
| | 1-10 | 11-15 | 16-25 | 26- |
| 0 W > Δ Pini ≥ −40 W | FPOT Extension 2 s/Normal Speed | FPOT Extension 2 s/Normal Speed | FPOT Extension 2 s/Normal Speed | FPOT Extension 2 s/Normal Speed |
| −40 W > Δ Pini ≥ −100 W | Low Speed Printing | FPOT Extension 3 s/Sheet Interval Extended | FPOT Extension 3 s/Sheet Interval Extended | FPOT Extension 3 s/Sheet Interval Extended |
| −100 W > Δ Pini ≥ −150 W | Low Speed Printing | Low Speed Printing | FPOT Extension 5 s/Sheet Interval Extended | FPOT Extension 5 s/Sheet Interval Extended |
| −150 W > Δ Pini ≥ −200 W | Low Speed Printing | Low Speed Printing | Low Speed Printing | FPOT Extension 5 s/Sheet Interval Extended |
| −200 W > Δ Pini | Low Speed Printing | Low Speed Printing | Low Speed Printing | Low Speed Printing |

Table 5 is a table for determining the power saving mode based on the differential power ΔPini and the total printing number of sheets of the print job. For example, in a case where the calculated differential power ΔPini is −120 W and the total printing number of sheets of the print job is 20 sheets, the CPU 32 selects a power saving mode that extends the FPOT by five seconds and extends the sheet interval.

A characteristic of Table 5 is that, in a case where the differential power ΔPini is small (0 W>ΔPini≥−40 W), because replenishment of the heat quantity can be performed by extending the preparation operation for image formation by a short time period (for example, two seconds), the FPOT is extended and printing is performed at normal speed. On the other hand, in a case where the differential power ΔPini is large (−200 W>ΔPini), because printing must be executed using a lower amount of power, printing at a low speed (low speed printing) is performed in which the printing speed is lowered relative to the normal speed. Further, in a case where the differential power ΔPini is insufficient to a certain extent (−40 W>ΔPini≥−200 W), a setting such that the print job finishes quickly is made according to the total printing number of sheets of the print job. That is, as described referring to FIG. 11, printing at a low speed is performed in a case where the total printing number of sheets is small, while in a case where the total printing number of sheets is large, printing is performed after extending the FPOT and the sheet interval. In S204, the CPU 32 starts printing in the power saving mode determined in S203.

In a case where the control described above is performed, in an apparatus in which image formation was started with a lower throughput than the maximum throughput due to a limitation with respect to the power of the AC power supply 50, selection of the optimal power saving mode is performed according to the power amount shortage and the total printing number of sheets of the print job. By this means, it is possible to provide the maximum productivity possible to the user. Thus, according to Embodiment 2, the optimal power saving mode can be selected according to the power conditions and printing conditions, and productivity can be improved to the fullest extent possible.

Embodiment 3

In Embodiment 1, the power Pfsr that is assumed to be required by the heater 100 is calculated based on the current environment temperature level, the warmed-up level Dx of the fixing device 30, and the average printing rate information for printing performed at the initial stage of printing. In Embodiment 3, in addition to the contents of Embodiment 1, the power Pfsr that is assumed to be required by the heater 100 is calculated as follows. That is, the power Pfsr is calculated by taking into account an increase or decrease in the power in a case where the temperature is raised or lowered (hereunder, referred to as "increasing or decreasing the temperature") when performing temperature control of the heater 100 depending on information with regard to the sheet type of the sheet 21, maximum printing rate information for printing performed at the initial stage of printing and the like.

[Correction of Power Assumed to be Required by Heater 100 According to Sheet Type]

Table 6 shows temperature increases and decreases when performing temperature control and increases and decreases in the required power of the fixing device 30 according to the basic weight of the sheet 21. In this case, the basic weight of the sheet 21 is the mass (g/m$^2$) of the sheet 21 per unit area.

TABLE 6

| Basic Weight of Sheet | Temperature Increase/Decrease | Power Increase/Decrease |
|---|---|---|
| 60 g/m$^2$ | −9° C. | −90 W |
| 70 g/m$^2$ | −6° C. | −60 W |
| 80 g/m$^2$ | −3° C. | −30 W |
| 90 g/m$^2$ | ±0° C. | ±0 W |
| 95 g/m$^2$ | +5° C. | +50 W |

The basic weight of the sheet 21 is obtained by the sheet type detection unit 303 as a second detection unit shown in FIG. 4 which obtains the basic weight of the sheet 21 by, for example, a known method. In addition, the basic weight of the sheet 21 is obtained by the sheet type obtaining unit 304 as a sheet type obtaining unit that obtains information set by a user or the like. In general, the larger the basic weight of the sheet 21 is, the greater the heat quantity required for the fixing process will be. Therefore, the larger the basic weight of the sheet 21 is, the higher that the temperature must be made when performing temperature control of the heater 100. In Embodiment 3, control is performed so as to supply a heat quantity that is required for a fixing process to the fixing device 30 by increasing or decreasing the temperature when performing temperature control of the heater 100, based on basic weight information of the sheet 21. Table 6 can also be said to be a table that can be used for correcting the power Pfsr that is assumed to be required by the heater 100 according to the type of the sheet 21. The CPU 32 functions as a first correcting unit that corrects the power Pfsr based on information with regard to the type of the sheet 21 that is detected by the sheet type detection unit 303 or is obtained by the sheet type obtaining unit 304.

For example, a case where the basic weight of the sheet 21 is 90 g/m² is taken as a standard. That is, an increase or decrease in the temperature at the time of temperature control of the heater 100 that is required when the basic weight of the sheet 21 is 90 g/m² is taken as ±0° C. In the case of a sheet 21 whose basic weight exceeds 90 g/m², it is necessary to raise the temperature when performing temperature control of the heater 100 during the fixing process. Further, by raising the temperature at the time of temperature control of the heater 100 when subjecting a sheet 21 whose basic weight exceeds 90 g/m² to a fixing process, the power Pfsr that is assumed to be required by the heater 100 also increases. For example, in a case where the basic weight of the sheet 21 is 95 g/m², the temperature at the time of temperature control of the heater 100 is corrected to be 5° C. higher, and the power Pfsr that is assumed to be required by the heater 100 is corrected by +50 W.

Conversely, in the case of a sheet 21 whose basic weight is less than 90 g/m², it is possible to perform the fixing process at a lower temperature without adversely affecting an image. Therefore, the temperature when performing fixing can be lowered, and it is possible to decrease the power Pfsr that is assumed to be required by the heater 100. For example, in a case where the basic weight of the sheet 21 is 80 g/m², the temperature at the time of temperature control of the heater 100 is corrected so as to be lower by 3° C., and the power Pfsr that is assumed to be required by the heater 100 is corrected by −30 W.

The table for calculating the power Pfsr that is assumed to be required by the heater 100 that is shown in Table 1 of Embodiment 1 is a table that is based on the assumption of a case where the basic weight that serves as the standard is 90 g/m². Values that are determined by means of Table 1 are corrected by increase and decrease values for the power that are shown in Table 6, based on the basic weight information for the relevant sheet 21. By this means, the power Pfsr that is assumed to be required by the heater 100 can be determined with greater accuracy. For example, in a case where the power Pfsr is determined as 850 W from Table 1, if the basic weight of the sheet 21 is 95 g/m², the corrected power Pfsr will be 900 W (=850 W+50 W). Further, for example, if the basic weight of the sheet 21 is 80 g/m², the corrected power Pfsr will be 820 W (=850 W−30 W). By determining the power Pfsr that is assumed to be required by the heater 100 based on sheet type information for the sheet 21 in this way, it is possible to select the optimal power saving mode when selecting the power saving mode as described in Embodiment 1. The control of Embodiment 3 is not limited to the basic weight of the sheet 21, and may also be performed according to another characteristic value or sheet type (thickness, surface property or the like) of the sheet 21.

[Correction of Power Assumed to be Required by Heater 100 According to Maximum Printing Rate Information]

Table 7 is a table that shows increases and decreases in the temperature at a time of temperature control and increases are decreases in the power assumed to be required by the heater 100 according to maximum printing rate information for the first three sheets when printing a plurality of the sheets 21.

TABLE 7

| Maximum Printing Rate Information | Temperature Increase/Decrease | Power Increase/Decrease |
|---|---|---|
| 80% | −24° C. | −180 W |
| 90% | −22° C. | −165 W |
| 100% | −20° C. | −150 W |
| 110% | −18° C. | −135 W |
| 120% | −16° C. | −120 W |
| 130% | −14° C. | −105 W |
| 140% | −12° C. | −90 W |
| 150% | −10° C. | −75 W |
| 160% | −8° C. | −60 W |
| 170% | −6° C. | −45 W |
| 180% | −4° C. | −30 W |
| 190% | −2° C. | −15 W |
| 200% | ±0° C. | ±0 W |
| 210% | +2° C. | +15 W |
| 220% | +4° C. | +30 W |
| 230% | +6° C. | +45 W |
| 240% | +8° C. | +60 W |
| 250% | +10° C. | +75 W |

The term "printing rate" refers to a value (hereunder, referred to as "total value") obtained by expressing the density of each color as a percentage (hereunder, referred to as "density percentage") and adding together the density percentages of each color. Here, the entire image of one sheet is divided into blocks of a unit area, and a printing rate that is determined for each block is taken as a block printing rate. The highest printing rate among the block printing rates of the respective blocks that are determined is called the maximum printing rate of the page (hereunder, referred to as "maximum printing rate"). For example, in a case where an image in which the density percentage of magenta is 100%, the density percentage of cyan is 100% and the density percentage of yellow is 0% (hereunder, referred to as "secondary color solid image") is present in a block of a unit area in which the printing rate is highest, the maximum printing rate of the relevant page is 200%. The aforementioned value such as 200% is referred to as "maximum printing rate information". In this case, the printing rate obtaining part 316 functions as a high printing rate obtaining unit that obtains the maximum printing rate for each sheet 21 from the first sheet to a sheet of a predetermined number of the print job, and obtains the printing rate that is highest among the obtained predetermined number of sheets. The printing rate that is highest among the predetermined number of sheets is taken as the high printing rate.

In general, the higher that the maximum printing rate is, the greater the heat quantity required for the fixing process will be. Consequently, it will be necessary to raise the temperature when performing temperature control of the heater 100. In Embodiment 3, control is performed so as to supply a heat quantity that is required for a fixing process to the fixing device 30 by increasing or decreasing the temperature when performing temperature control of the heater 100, based on maximum printing rate information. Here, a case where the maximum value among the maximum printing rate information for the first three sheets is 200% is taken as a standard. That is, in a case where the maximum value of the maximum printing rate information for the first three sheets is 200%, an increase or decrease in the temperature at the time of temperature control of the heater 100 is taken as ±0° C. Table 6 can also be said to be a table that can be used for correcting the power Pfsr that is assumed to be required by the heater 100 according to a maximum value among the maximum printing rate information for the first three sheets (hereunder, referred to as "maximum value of the maximum printing rate information"). The CPU 32 functions as a second correcting unit that corrects the power Pfsr based on the highest printing rate among the printing rates obtained by the printing rate obtaining part 316.

For example, in a case where the maximum printing rate exceeds 200%, it is necessary to raise the temperature when performing temperature control of the heater 100 in order to perform a fixing process. The power assumed to be required by the heater 100 increases as a result of raising the temperature when performing temperature control of the heater 100. For example, if the maximum value of the maximum printing rate information for the first three sheets is 230%, the temperature when performing temperature control of the heater 100 will be corrected to a temperature that is 6° C. higher, and the power Pfsr that is assumed to be required by the heater 100 will be corrected by +45 W.

Conversely, when performing printing of a plurality of the sheets 21, if the maximum value of the maximum printing rate information for the first three sheets is less than 200%, it is possible to perform the fixing process at a low temperature without adversely affecting the image. Therefore, the temperature when performing fixing can be lowered, and it is possible to decrease the power Pfsr that is assumed to be required by the heater 100. The table for calculating the power Pfsr that is assumed to be required by the heater 100 that is described in Table 1 of Embodiment 1 is a table that assumes a case where the maximum value of the maximum printing rate information for the first three sheets that is taken as a maximum value of the maximum printing rate information that serves as the standard is 200%. Therefore, values that are determined by means of Table 1 based on the maximum value of the maximum printing rate information for the first three sheets are corrected by increase and decrease values for the power shown in Table 6. By this means, the power Pfsr that is assumed to be required by the heater 100 can be determined with greater accuracy.

For example, in a case where the power Pfsr is determined as 850 W from Table 1, if the maximum value of the maximum printing rate information for the first three sheets is 230%, the corrected power Pfsr will be 895 W (=850 W+45 W). Further, for example, if the aforementioned maximum value is 120%, the corrected power Pfsr will be 730 W (=850 W−120 W). By determining the power Pfsr that is assumed to be required by the heater 100 based on the maximum value of the maximum printing rate information for the first three sheets in this way, it is possible to select the optimal power saving mode when selecting the power saving mode as described in Embodiment 1.

[Processing for Determining Power Supply Availability]

The configuration of the image forming apparatus, (2) the power saving mode selection processing and (3) the processing to determine the throughput change necessity after printing starts are the same as in Embodiment 1, and hence a description thereof is omitted here. Using the flowchart of FIG. 13, (1) the processing for determining power supply availability that is different in Embodiment 3 in comparison to Embodiment 1 will now be described.

Figure 13:
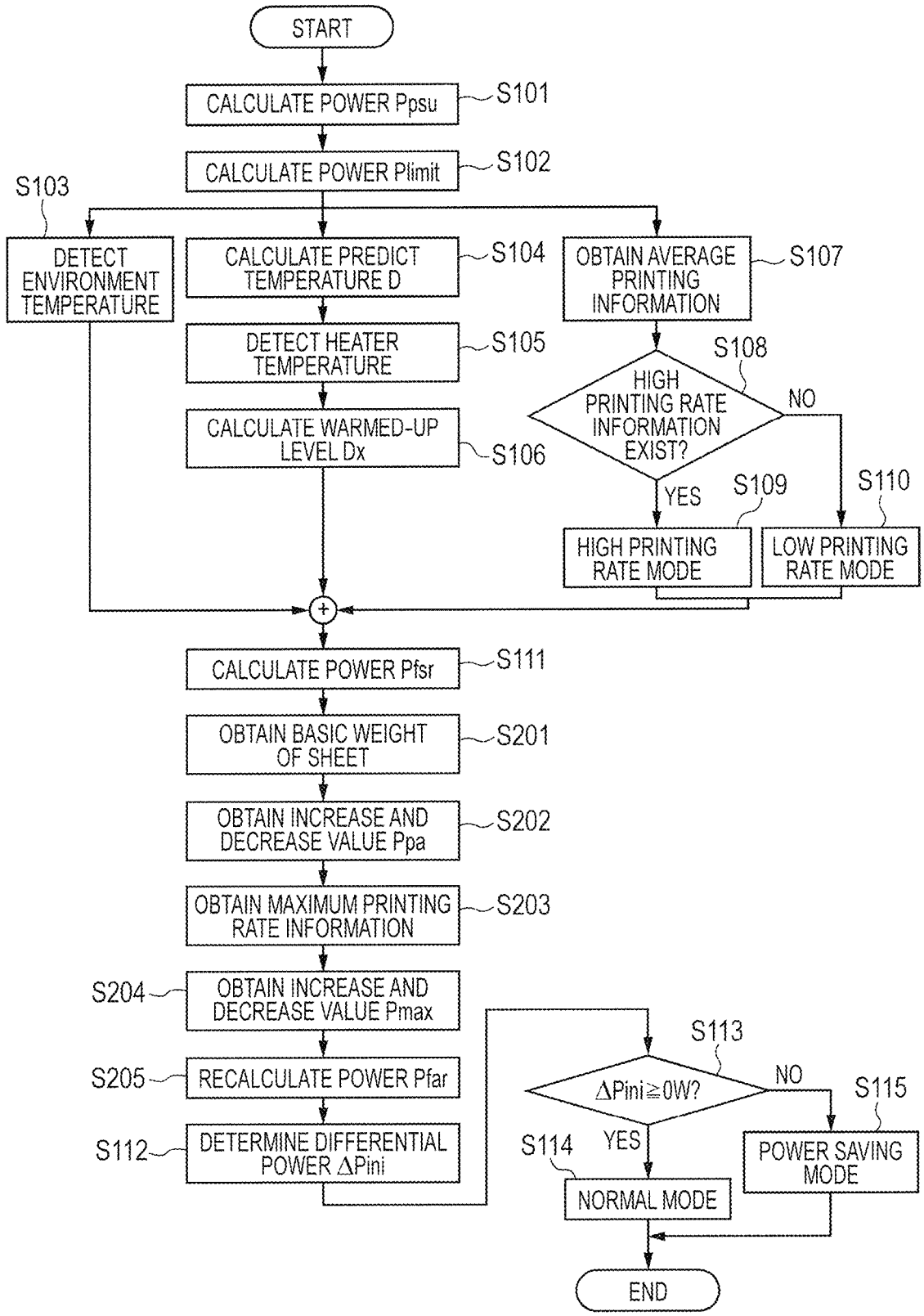
FIG. 13 is a flowchart illustrating processing for determining power supply availability of Embodiment 3.

In FIG. 13, processing that is the same as processing in FIG. 5 is denoted by the same step numbers as in FIG. 5, and a description of such processing is omitted here. In S111, the CPU 32 determines the power Pfsr that is assumed to be required by the heater 100 from Table 1 based on the environment temperature detected in S103, the warmed-up level Dx of fixing device 30 determined in S106, and the printing rate mode that was set in S109 or S110. Note that, in Embodiment 3, a power for which the power Pfsr determined in S111 serves as a standard is referred to hereunder as "power Pfsr0". As described above, Table 1 is a table for a time when the type of the sheet 21 is a predetermined sheet type (for example, a sheet with a basic weight of 90 g/m²) and the maximum value of the maximum printing rate information of the first three sheets is a predetermined maximum value (for example, 200%).

In S201, the CPU 32 obtains basic weight information of the sheet 21 based on a result detected by the sheet type detection unit 303 or a result obtained by the sheet type obtaining unit 304. In S202, based on the basic weight information of the sheet 21 obtained in S201, the CPU 32 refers to Table 6 to obtain an increase and decrease value Ppa for the power Pfsr0 that is assumed to be required by the heater 100. For example, in a case where the basic weight of the sheet 21 is 80 g/m², the increase and decrease value Ppa of −30 W is obtained from Table 6.

In S203, the CPU 32 obtains maximum printing rate information for each of the first, second and third sheets 21 based on image information by means of the printing rate obtaining part 316. The maximum printing rate information is the maximum printing rate per unit area for the entire toner image. In S204, based on the maximum value of the maximum printing rate information of the three sheets 21 obtained in S203, the CPU 32 refers to Table 7 to obtain an increase and decrease value Pmax of the power Pfsr0 that is assumed to be required by the heater 100. For example, in a case where the maximum value of the maximum printing rate information is 230%, an increase and decrease value Pmax of +45 W is obtained from Table 7. In S205, based on the increase and decrease value Ppa that is based on the basic weight of the sheet 21, and the increase and decrease value Pmax that is based on the maximum value of the maximum printing rate information, the CPU 32 recalculates the corrected power Pfsr that is assumed to be required by the heater 100 by the following Formula (9). The CPU 32 functions as a third correcting unit.

$$Pfsr = Pfsr0 + Ppa + Pmax \quad (9)$$

Since the processing in S112 to S115 has been described above referring to FIG. 5, a description thereof is omitted here.

Thus, by using the basic weight information of the sheet 21 and maximum printing rate information regarding a print image, the power Pfsr that is assumed to be required by the heater 100 can be calculated with greater accuracy. By this means, it is possible to select the most suitable power saving mode when selecting a power saving mode. Note that, the power assumed to be required by the heater 100 may also be calculated based on either one of the basic weight information and the maximum printing rate information of the sheet 21. Further, in Embodiments 1 and 3 a configuration is adopted in which, when obtaining printing rate information, the predetermined number of sheets at an initial stage during a print job is taken as, for example, the first sheet to a sheet of a predetermined number. However, as long as a predetermined number of sheets at an initial stage during a print job are used for obtaining the printing rate information, the sheets are not limited to the first sheet to a sheet of a predetermined number. As described in the foregoing, according to Embodiment 3 the power required by the heater can be determined with greater accuracy.

Embodiment 4

In Embodiment 1, the predicted required power $P_{NEXT}$ is determined based on respective consumption powers when printing a plurality of the sheets 21 printed in the past, printing rate information regarding the plurality of sheets 21 printed in the past, and printing rate information for a predetermined number of the sheets 21 that are going to be printed next. In Embodiment 4, the predicted required power $P_{NEXT}$ is calculated based on a warmed-up condition of the fixing device 30, a target temperature in a fixing process for fixing a plurality of the sheets 21 printed in the past, and a target temperature in a fixing process for fixing a plurality of the sheets 21 that are going to be printed next.

[Predicted Required Power $P_{NEXT}$]

Table 8 shows the relation between a warmed-up condition of the fixing device 30, an increase and decrease amount in a target temperature in a fixing process, and an increase and decrease amount in the required power. In general, the higher that the target temperature when performing temperature control of the fixing heater 100 is, the larger that the heat quantity required for the fixing process will be. Further, the correlation between the temperature and the heat quantity changes depending on the warmed-up condition of the fixing device 30. In Embodiment 4, in a case where the warmed-up condition of the fixing device 30 is a cold state, when the target temperature in the fixing process increases or decreases by 1° C., the required power increases or decreases by 10 W. Further, in a case where the warmed-up condition of the fixing device 30 is a normal state, when the target temperature increases or decreases by 1° C., the required power increases or decreases by 8 W. In addition, in a case where the warmed-up condition of the fixing device 30 is a hot state, when the target temperature increases or decreases by 1° C., the required power increases or decreases by 7 W. Note that, when the warmed-up condition is the same, an increase or decrease in the required power changes, for example, in a linear shape with respect to an increase or decrease in the temperature.

TABLE 8

| Increase and Decrease Amount in Required Power for 1° C. of Target Temperature | | | |
|---|---|---|---|
| Warmed-Up Condition for Fixing | Cold | Normal | Hot |
| Increase and Decrease Amount of Required Power | 10 W | 8 W | 7 W |

[Processing to Determine Throughput Change Necessity after Printing Starts]

Figure 14:
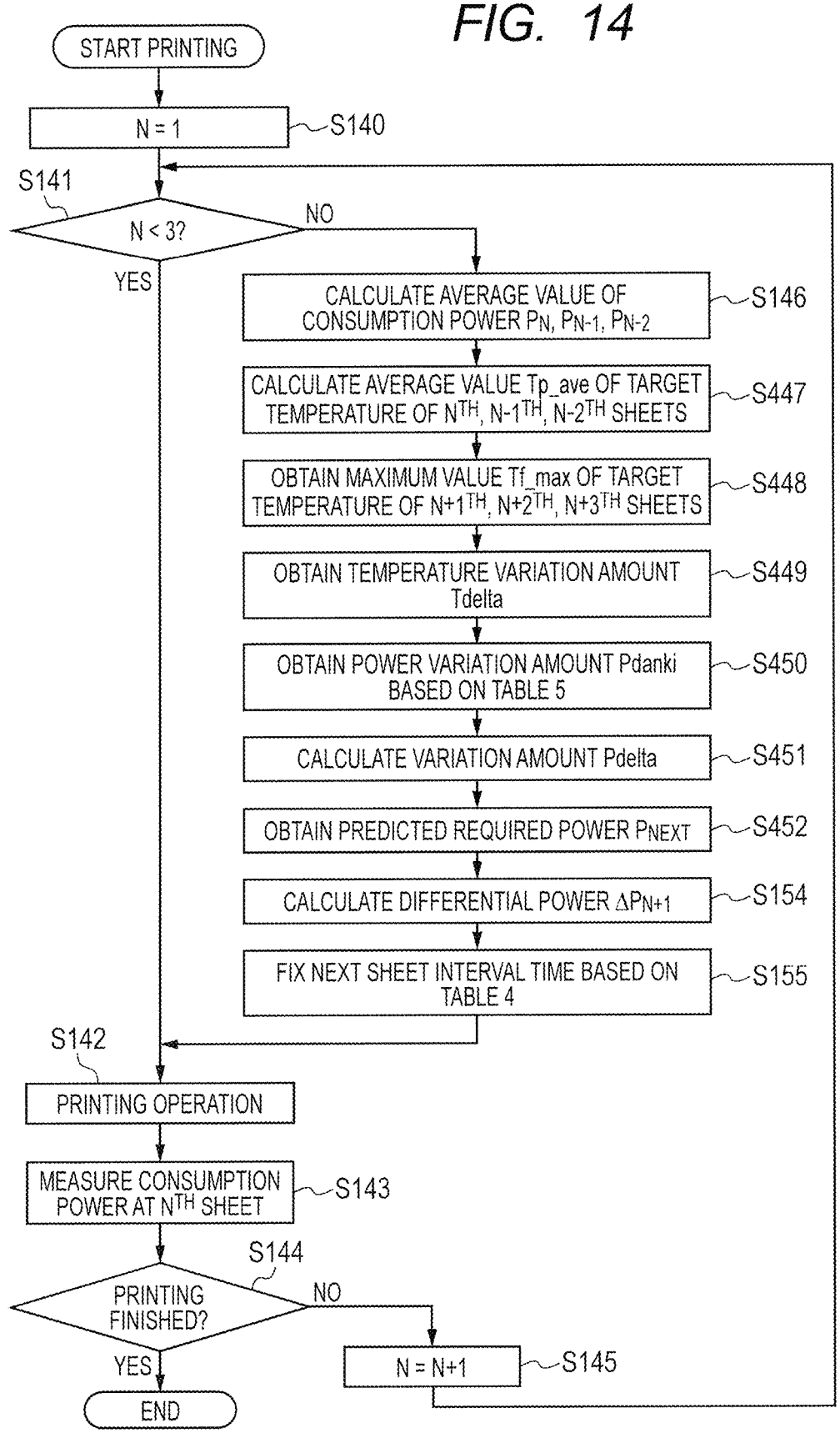
FIG. 14 is a flowchart illustrating processing for determining whether to change a sheet interval amount after printing starts of Embodiment 4.

The configuration of the image forming apparatus, (1) the processing for determining power supply availability and (2) the power saving mode selection processing are the same as in Embodiment 1. Using FIG. 14, (3) the processing to determine the throughput change necessity after printing starts that is different in Embodiment 4 relative to Embodiment 1 will now be described. In FIG. 14, processing that is the same as processing in S140 to S146 of FIG. 8 is denoted by the same step numbers as in FIG. 8, and a description of such processing is omitted here. If the CPU 32 determines in S141 that the number of print sheets N is three sheets or more, the CPU 32 enters processing from S146 onward for performing predictive calculation of the required power.

In S447, the CPU 32 calculates an average value Tp_ave of the target temperature based on information regarding the target temperature at a time of fixing the past three sheets, specifically, the $N^{TH}$ sheet, $N-1^{TH}$ sheet and $N-2^{TH}$ sheet. The CPU 32 stores the calculated average value Tp_ave in the RAM 32b. In S448, the CPU 32 obtains a maximum value Tf_max of information regarding the target temperature for a time of fixing three sheets that are scheduled to be printed next, specifically, an $N+1^{TH}$ sheet, an $N+2^{TH}$ sheet and an $N+3^{TH}$ sheet. The CPU 32 stores the obtained maximum value Tf_max in the RAM 32b.

In S449, based on the average value Tp_ave of the past target temperatures and the maximum value Tf_max of the next (future) target temperatures, the CPU 32 determines a temperature variation amount Tdelta by the following Formula (10).

$$T\text{delta}=Tf\_\max-Tp\_\text{ave} \quad (10)$$

In S450, the CPU 32 refers to Table 8 based on the current warmed-up condition of the fixing device 30, and obtains a power variation amount Pdanki. Note that, the current warmed-up condition of the fixing device 30 is determined in a similar manner to Embodiment 1. For example, in a case where the current warmed-up condition of the fixing device 30 is "Normal state", the CPU 32 obtains an increase and decrease amount of 8 W for the required power from Table 8. Hereunder, an increase and decrease amount for the required power that is obtained from Table 8 is referred to as "power variation amount Pdanki". In S451, based on the temperature variation amount Tdelta determined in S449 and the power variation amount Pdanki obtained in S450, the CPU 32 calculates a variation amount Pdelta of the required power by the following Formula (11).

$$P\text{delta}=T\text{delta}\times P\text{danki} \quad (11)$$

In S452, the CPU 32 obtains the predicted required power $P_{NEXT}$ by the following Formula (12).

$$P_{NEXT}=(P_N+P_{N-1}+P_{N-2})/3+P\text{delta} \quad (12)$$

Note that, processing that is the same as processing from S154 onward of FIG. 8 is denoted by the same step numbers as in FIG. 8, and a description of such processing is omitted here. Thus, in Embodiment 4 also, the predicted required power $P_{NEXT}$ is obtained in S452, and shortening or extending of the sheet interval is performed depending on the value of the differential power $\Delta P_{N+1}$ that is calculated based on the predicted required power $P_{NEXT}$. The table that is used when obtaining an extension time (s) of the sheet interval based on the differential power $\Delta P_{N+1}$ is Table 4. The information of Table 4 is stored in advance in the ROM 32a inside the CPU 32.

[Case where Printing Started in Print Mode at Low Speed]

Figure 15:
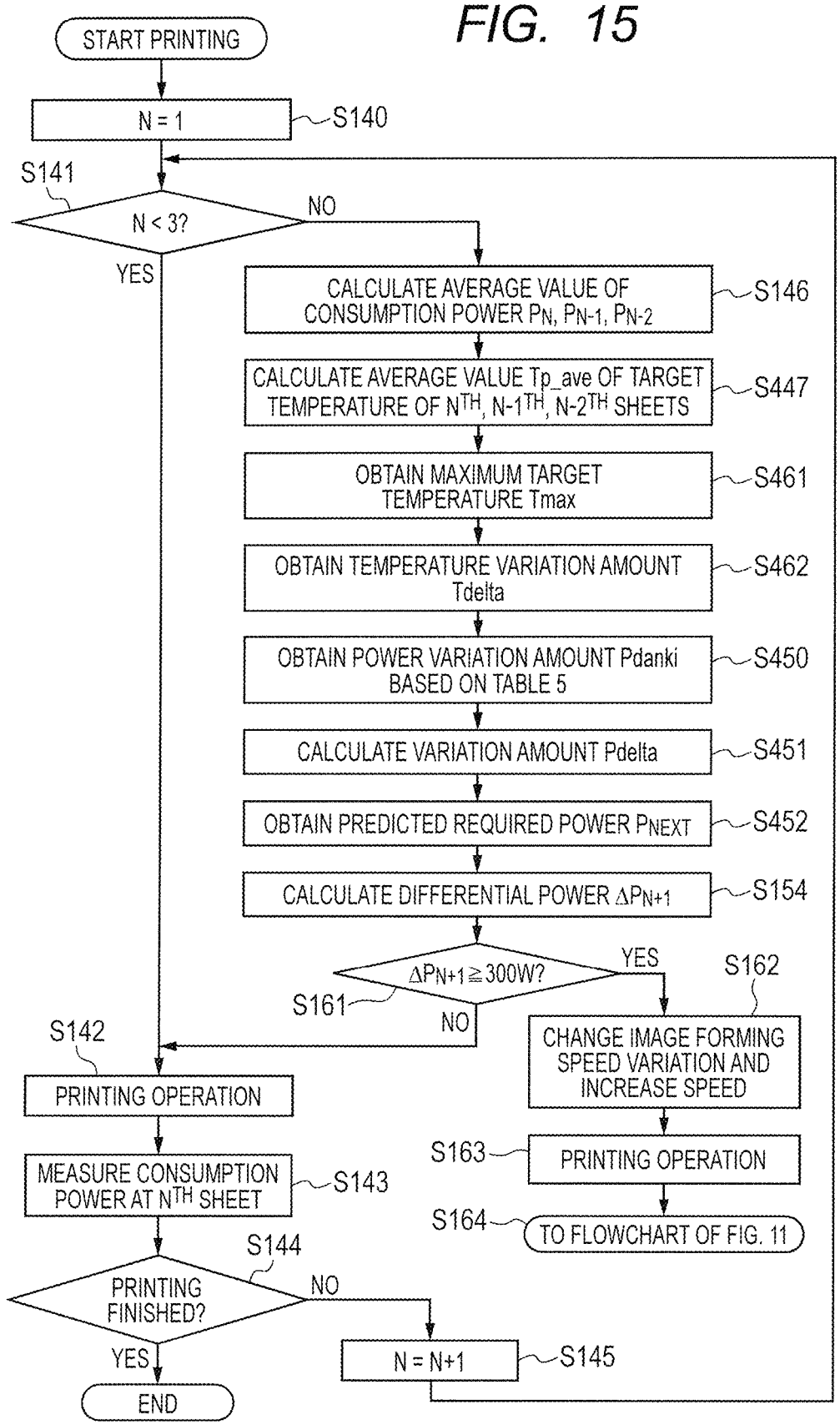
FIG. 15 is a flowchart illustrating processing for determining whether to change an image forming speed after printing starts of Embodiment 4.

Next, operations performed after printing was started in a print mode at a low speed are described using the flowchart of FIG. 15. Processing in FIG. 15 that is the same as processing in FIG. 14 is denoted by the same step numbers as in FIG. 14, and a description of such processing is omitted here. The processing in S461 and S462 that differs from FIG. 14 will be described. The process of calculating the power is the same as when printing in a print mode in which the sheet interval was extended. In S461, the CPU 32 obtains a maximum target temperature Tmax. The CPU 32 does not depend on the information regarding the target temperatures for the next three sheets, and instead calculates the predicted required power $P_{NEXT}$ and the differential power $\Delta P_{N+1}$ by assuming that power is required for a time when the maximum target temperature that can be set as the target temperature of the heater 100 is set in the print mode. In S462, the CPU 32 obtains the temperature variation amount Tdelta from the following Formula (13), based on the average value Tp_ave of past target temperatures and the maximum target temperature Tmax obtained in S461.

$$T\text{delta} = T\text{max} - T p\_\text{ave} \quad (13)$$

Note that, processing that is the same as processing from S161 to S164 of FIG. 10 is denoted by the same step numbers as in FIG. 10, and a description of such processing is omitted here. The CPU 32 determines in S161 that there is a surplus of 300 W or more with respect to the differential power $\Delta P_{N+1}$, switches the image forming speed to a high speed in S162, and continues the printing operation in S163. The CPU 32 functions as a second determination unit that determines whether or not to make the image forming speed faster based on the target temperature (specifically, the average value Tp_ave) of the heater 100 when a fixing process was performed by the fixing device 30 on a plurality of the sheets 21 and the maximum target temperature Tmax. In the processing in S164 of FIG. 15, as a precaution, the CPU 32 transits to the flowchart of FIG. 14 to perform control to check the power thereafter also, and to adjust the sheet interval as necessary. However, since this processing is after an adequate margin has been secured with respect to the power and switching of the image forming speed was performed, a configuration may also be adopted in which processing to check the power thereafter is not performed.

In a case where the control described above is performed, even if the optimal power required for a fixing process differs depending on the situation regarding a power shortage or the printing conditions or the like, because the required power is predicted with greater accuracy, the optimal power saving mode and throughput can be selected. It is thereby possible to provide the maximum productivity. Thus, according to Embodiment 4, the power that will be required when performing a fixing process on multiple sheets of recording material that are scheduled to be printed next can be accurately determined.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-007605, filed Jan. 19, 2017, Japanese Patent Application No. 2017-007606, filed Jan. 19, 2017, and Japanese Patent Application No. 2017-007607, filed Jan. 19, 2017, which are hereby incorporated by reference herein in their entirety.

What is claimed is:

1. An image forming apparatus comprising:
   an image forming unit configured to form an unfixed toner image on a recording material;
   a fixing unit having a heater, the fixing unit configured to fix the unfixed toner image formed by the image forming unit onto the recording material by means of heat of the heater;
   a suppliable power obtaining unit configured to obtain a suppliable power that is suppliable to the heater; and
   a required power obtaining unit configured to obtain a required power that is assumed to be required by the heater for fixing the unfixed toner image onto the recording material during a fixing process in which the recording material passes through the fixing unit;
   wherein based on a difference between the required power and the suppliable power, the apparatus selects whether to start printing in a first mode or to start printing in one of second modes, in each of which the required power required by the heater during the fixing process is lower than the required power required by the heater in the first mode, and
   wherein the second modes are modes that execute any one of, or a combination of, a first control for extending a warm-up time of the fixing unit until a first recording material enters the fixing unit, a second control for increasing a sheet interval of a plurality of recording materials continuously entering the fixing unit, and a third control in which a recording material conveying speed is slower than that of the first mode.

2. An image forming apparatus according to claim 1, wherein the apparatus further selects the one of the second modes based on a number of sheets of a print job.

3. An image forming apparatus according to claim 1, further comprising:
   a first detection unit configured to detect a voltage of an AC power supply, and
   a second detection unit configured to detects a current of the AC power supply;
   wherein the suppliable power obtaining unit configured to calculate the suppliable power based on a voltage detected by the first detection unit and a current detected by the second detection unit.

4. An image forming apparatus according to claim 1, further comprising:
   a third detection unit configured to detect a current that flows to the heater;
   wherein in a case where a mode including the second control is selected from among the second modes, the apparatus calculates the required power that is assumed to be required by the heater during the fixing process based on an average value of a power for a predetermined number of sheets of recording material that is measured based on a detection result of the third detection unit when the fixing process is performed by the fixing unit on the predetermined number of sheets of recording material in the past, and a first printing rate of the toner image of the predetermined number of sheets that is scheduled to be printed, and determines an extension time of the sheet interval based on the required power that is calculated.

5. An image forming apparatus according to claim 1, wherein the one of the second modes includes only the first control, another one of the second modes includes only the first and second controls and still the another one of the second modes includes only the third control.

6. An image forming apparatus according to claim 1, wherein the fixing unit includes a cylindrical film and a roller contacting an outer surface of the film,
   wherein the heater is located in an inner space of the film, and
   wherein a fixing nip portion for pinching and conveying the recording material is formed by the heater and the roller through the film.

7. An image forming apparatus according to claim 6, wherein the heater includes a substrate and a heat generating element formed on the substrate.

* * * * *